US011939466B2

(12) United States Patent
Miyamoto et al.

(10) Patent No.: US 11,939,466 B2
(45) Date of Patent: Mar. 26, 2024

(54) THERMOPLASTIC POLYESTER RESIN COMPOSITION AND MOLDED ARTICLE

(71) Applicant: TORAY Industries, Inc., Tokyo (JP)

(72) Inventors: Kohei Miyamoto, Nagoya (JP); Yusuke Tojo, Nagoya (JP); Makito Yokoe, Nagoya (JP); Kosuke Shirotani, Nagoya (JP); Yasuo Maeda, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 397 days.

(21) Appl. No.: 17/267,991

(22) PCT Filed: Sep. 13, 2019

(86) PCT No.: PCT/JP2019/036056
§ 371 (c)(1),
(2) Date: Feb. 11, 2021

(87) PCT Pub. No.: WO2020/059651
PCT Pub. Date: Mar. 26, 2020

(65) Prior Publication Data
US 2021/0332231 A1 Oct. 28, 2021

(30) Foreign Application Priority Data

Sep. 20, 2018 (JP) ................. 2018-175503
Oct. 31, 2018 (JP) ................. 2018-205386
Dec. 27, 2018 (JP) ................. 2018-243939
Jan. 29, 2019 (JP) ................. 2019-012697
Mar. 14, 2019 (JP) ................. 2019-046819

(51) Int. Cl.
*C08L 67/02* (2006.01)
*B32B 15/085* (2006.01)
*B32B 15/09* (2006.01)
*B32B 27/18* (2006.01)
*B32B 27/20* (2006.01)
*B32B 27/28* (2006.01)
*B32B 27/30* (2006.01)
*B32B 27/32* (2006.01)
*B32B 27/36* (2006.01)
*C08K 5/50* (2006.01)
*C08L 23/06* (2006.01)
*C08L 23/08* (2006.01)
*C08L 25/06* (2006.01)
*C08L 25/08* (2006.01)
*C08L 67/00* (2006.01)
*C08L 71/12* (2006.01)
*C08L 81/04* (2006.01)
*B32B 15/18* (2006.01)
*B32B 15/20* (2006.01)

(52) U.S. Cl.
CPC .............. *C08L 67/02* (2013.01); *B32B 15/09* (2013.01); *B32B 27/20* (2013.01); *B32B 27/36* (2013.01); *B32B 15/085* (2013.01); *B32B 15/18* (2013.01); *B32B 15/20* (2013.01); *B32B 27/18* (2013.01); *B32B 27/285* (2013.01); *B32B 27/286* (2013.01); *B32B 27/302* (2013.01); *B32B 27/32* (2013.01); *B32B 27/325* (2013.01); *B32B 2270/00* (2013.01); *B32B 2307/204* (2013.01); *B32B 2457/00* (2013.01); *C08K 5/50* (2013.01); *C08L 23/06* (2013.01); *C08L 23/08* (2013.01); *C08L 23/0884* (2013.01); *C08L 25/06* (2013.01); *C08L 25/08* (2013.01); *C08L 67/00* (2013.01); *C08L 71/12* (2013.01); *C08L 81/04* (2013.01)

(58) Field of Classification Search
None
See application file for complete search history.

(56) References Cited

U.S. PATENT DOCUMENTS 4,102,853 A * 7/1978 Kawamura ............ C08K 13/02
524/424
4,461,871 A * 7/1984 Kometani ............... C08L 67/02
525/166

(Continued)

FOREIGN PATENT DOCUMENTS

EP     0 682 080 A1    11/1995
JP     6-145481 A    5/1994

(Continued)

OTHER PUBLICATIONS

International Search Report, issued in PCT/JP2019/036056, dated Nov. 19, 2019.

(Continued)

*Primary Examiner* — Vivian Chen
(74) *Attorney, Agent, or Firm* — Birch, Stewart, Kolasch & Birch, LLP

(57) ABSTRACT

Provided is a thermoplastic polyester resin composition comprising 100 parts by weight of (A) a non-liquid crystal thermoplastic polyester resin, 45 to 150 parts by weight of (B) a thermoplastic resin that is different from the non-liquid crystal thermoplastic polyester resin and has a dielectric loss tangent of not more than 0.005 when measured at a frequency of 5.8 GHz by the cavity resonance perturbation method, 2 to 20 parts by weight of (C) a compatibilizer having at least one reactive functional group selected from epoxy, acid anhydride, oxazoline, isocyanate, and carbodiimide groups, and 0.2 to 5 parts by weight of (D) at least one compound selected from tertiary amines, amidine compounds, organic phosphines and salts thereof, imidazoles, and boron compounds, wherein the ratio of the sum of the thermoplastic resin (B) and the compatibilizer (C) is in the range of 50 to 150 parts by weight and the weight ratio (B)/(C) of the thermoplastic resin (B) to the compatibilizer (C) is in the range of 8 to 50. The thermoplastic polyester resin composition can be molded into an article with low dielectric properties, excellent mechanical properties, and high bondability to metals.

12 Claims, No Drawings

(56) References Cited

U.S. PATENT DOCUMENTS

| | | | | |
|---|---|---|---|---|
| 4,786,688 A | * | 11/1988 | Thiersault | C08L 23/06 525/240 |
| 4,871,813 A | * | 10/1989 | Senez | C08L 23/0815 525/240 |
| 5,151,460 A | * | 9/1992 | Yates, III | C08L 69/00 525/394 |
| 5,530,047 A | * | 6/1996 | Watanabe | C08L 79/085 524/427 |
| 2007/0182059 A1 | * | 8/2007 | Ikegawa | C08L 67/04 264/234 |
| 2007/0190346 A1 | * | 8/2007 | Ikegawa | H05K 1/0353 428/458 |
| 2009/0111964 A1 | * | 4/2009 | Asahara | C08G 63/605 528/125 |
| 2011/0189453 A1 | | 8/2011 | Leemans et al. | |
| 2012/0301718 A1 | * | 11/2012 | Nishiura | B32B 27/285 428/458 |
| 2015/0313012 A1 | * | 10/2015 | Chen | C08K 5/549 428/221 |
| 2017/0292021 A1 | * | 10/2017 | Zhang | C08L 81/02 |
| 2018/0022898 A1 | * | 1/2018 | Pan | C08L 67/02 523/445 |
| 2018/0072883 A1 | * | 3/2018 | Pan | C08L 63/00 |
| 2020/0079919 A1 | | 3/2020 | Tsuchigane et al. | |
| 2020/0377718 A1 | * | 12/2020 | Guo | C08K 3/40 |
| 2022/0275149 A1 | * | 9/2022 | Tojo | C08K 7/14 |

FOREIGN PATENT DOCUMENTS

| | | | |
|---|---|---|---|
| JP | 8-41362 A | | 2/1996 |
| JP | 2003-193009 A | | 7/2003 |
| JP | 2005-23095 A | | 1/2005 |
| JP | 2009-155478 A | | 7/2009 |
| JP | 2009-242759 A | | 10/2009 |
| JP | 2009-292897 A | | 12/2009 |
| JP | 2010-150534 A | | 7/2010 |
| JP | 2010-180261 A | | 8/2010 |
| JP | 2011-526638 A | | 10/2011 |
| JP | 2011-253958 A | | 12/2011 |
| JP | 2013-31576 A | * | 7/2013 |
| JP | 2013-131576 A | | 7/2013 |
| JP | 2014-88515 A | | 5/2014 |
| JP | 2017-52974 A | | 3/2017 |
| JP | 2018-39970 A | | 3/2018 |
| WO | WO 2012/147845 A1 | | 11/2012 |
| WO | WO 2012/147847 A1 | | 11/2012 |
| WO | WO 2017/115757 A1 | | 7/2017 |
| WO | WO 2017/203467 A1 | | 11/2017 |

OTHER PUBLICATIONS

Written Opinion of the International Searching Authority, issued in PCT/JP2019/036056, dated Nov. 19, 2019.

* cited by examiner

THERMOPLASTIC POLYESTER RESIN COMPOSITION AND MOLDED ARTICLE

TECHNICAL FIELD

The present invention relates to a thermoplastic polyester resin composition and a molded article obtained by molding the same.

BACKGROUND ART

Thermoplastic polyester resins are used in a wide variety of applications, such as machines' mechanical components, electric/electronic components, and automobile components, by virtue of their excellent properties, such as injection molding properties and mechanical properties. Recently, thermoplastic polyester resins are expected to be applied to high-frequency compatible components, such as those for next-generation high-speed data communication antennas applicable to super-high-speed, large-capacity, and ultra-low-latency communication or those for automotive radars applicable to vehicle autopilot systems, and are required to have low dielectric properties (low dielectric constant and low dielectric loss tangent), which can help prevent dielectric loss, as electrical characteristics to cope with an increased frequency.

In addition, many composite parts (metal composite parts) integrated with metal components, such as electrodes and structural elements, by insert molding to provide more sophisticated functions are used as various components for recent automobiles and electric/electronic devices. For example, housing cases for mobile telecommunication devices, such as those for mobile terminals, may partially comprise a plastic material in a metal component to improve radio-wave transmitting and receiving properties, which are important for built-in antennas. For such metal composite parts, an increased bond strength of plastic-metal joints (metal bondability) is essential in view of resistance to damage caused by falling and of waterproofness, as well as low dielectric properties are required for plastic components to reduce transmission loss during high-frequency radio communications.

In view of those problems as above, thermoplastic polyester resins have limitations with respect to reduction of dielectric properties because dielectric loss in high-frequency ranges occurs due to polar groups in their molecular structures. Thus, additional use of other thermoplastic resins with excellently low dielectric properties, such as a polyolefin resin with no polar groups (for example, Patent Literature 1), and addition of glass fibers with excellently low dielectric properties (for example, Patent Literature 2 and 3) are being studied with respect to reduction of dielectric properties. Examples of thermoplastic resins that have excellently lower dielectric properties than those of thermoplastic polyester resins and are proposed to be used in combination with them include polyolefin resins, such as polyethylene (for example, Patent Literature 4 to 6); fluorinated resins, such as polytetrafluoroethylene (for example, Patent Literature 7); polystyrene resins (for example, Patent Literature 8); polyphenylene sulfide resins (for example, Patent Literature 9); liquid crystal resins (for example, Patent Literature 10); polyphenylene ether resins, and the like. As a method of using a thermoplastic polyester resin in combination with any of the above thermoplastic resins, a method of blending a compatibilizer, which is a compound with a structure that allows the compound to react or to be miscible both with both the thermoplastic polyester resin and with the thermoplastic resin, is known. Additionally, a resin composition with a defined dielectric loss tangent, which is achieved by using polybutylene terephthalate and polyethylene terephthalate as thermoplastic polyester resins, is proposed because of its high bondability to metals (for example, Patent Literature 11).

CITATION LIST

Patent Literature

Patent Literature 1: JP 2013-131576 A
Patent Literature 2: WO 2017/203467
Patent Literature 3: JP 2017-52974 A
Patent Literature 4: WO 2012/147845
Patent Literature 5: WO 2012/147847
Patent Literature 6: JP H6-145481 A
Patent Literature 7: JP 2011-526638 T
Patent Literature 8: JP 2009-292897 A
Patent Literature 9: JP 2010-180261 A
Patent Literature 10: JP 2005-23095 A
Patent Literature 11: WO 2017/115757

SUMMARY OF INVENTION

Technical Problem

However, it was not found whether the resin compositions disclosed in Patent Literature 4 to 10 had low dielectric properties. With respect to the technologies disclosed in Patent Literature 1 and 4 to 10, the above-described additional use of a thermoplastic resin with excellently low dielectric properties was expected to lower the dielectric properties of the resulting thermoplastic polyester resin composition. However, each thermoplastic resin with excellently low dielectric properties had poor effects on dielectric properties required for high-frequency compatible components, due to the addition of an insufficient amount of the thermoplastic resin. Moreover, when the blending ratio of the thermoplastic resin with excellently low dielectric properties was increased, it was sometimes found that the thermoplastic resin with excellently low dielectric properties was coarsely dispersed, and that mechanical properties and heat resistance were reduced due to the increased residual reactive groups in the resulting resin composition. Furthermore, in cases where a flexible elastomer was used as a compatibilizer, or where the amount of blended glass fibers used as a reinforcement material was decreased to reduce dielectric properties, the resulting molded articles suffered reduction in mechanical properties, such as flexural modulus, and in heat resistance and had problems during their use, such as deformation due to low stiffness. Additionally, the levels of metal bondability and low dielectric properties achieved by the method described in Patent Literature 11 were still far from the levels required for commercial goods which essentially required those properties. Even if the technologies disclosed in Patent Literature 1 to 10 were combined to further reduce dielectric properties, the requirements were still unsatisfied only with applied glass fibers with low dielectric properties, and problems such as reduction of mechanical properties and metal bondability occurred due to coarse dispersion of thermoplastic resins with excellently low dielectric properties.

An object of the present invention is to provide a thermoplastic polyester resin composition that is available to provide molded articles with low dielectric properties, excellent mechanical properties, high heat resistance, and high bondability to metals, and to provide a molded article obtained by molding the same.

Solution to Problem

The inventors studied hard to solve the above-described problems, and found that the above-described problems can be solved by blending (A) a non-liquid crystal thermoplastic polyester resin with (B) a thermoplastic resin with particular dielectric properties and (C) a compatibilizer having a particular reactive functional group(s) in a certain ratio, and further adding thereto (D) a compound having a particular structure, and consequently completed the present invention. That is, the present invention comprises the following components.

Provided is a thermoplastic polyester resin composition comprising 100 parts by weight of (A) a non-liquid crystal thermoplastic polyester resin, 45 to 150 parts by weight of (B) a thermoplastic resin that is different from the non-liquid crystal thermoplastic polyester resin and has a dielectric loss tangent of not more than 0.005 when measured at a frequency of 5.8 GHz by the cavity resonance perturbation method, 2 to 20 parts by weight of (C) a compatibilizer having at least one reactive functional group selected from epoxy, acid anhydride, oxazoline, isocyanate, and carbodiimide groups, and 0.2 to 5 parts by weight of (D) at least one compound selected from tertiary amines, amidine compounds, organic phosphines and salts thereof, imidazoles, and boron compounds, wherein the ratio of the sum of the thermoplastic resin (B) and the compatibilizer (C) is in the range of 50 to 150 parts by weight and the weight ratio (B)/(C) of the thermoplastic resin (B) to the compatibilizer (C) is in the range of 8 to 50.

The present invention includes a molded article obtained by molding the above thermoplastic polyester resin composition through a melt molding process.

Moreover, the present invention includes a metal composite molded article composed of a plastic component and a metal component, wherein the plastic component is made from the above thermoplastic polyester resin composition.

Advantageous Effects of Invention

The thermoplastic polyester resin composition according to the present invention can be molded into molded articles with low dielectric properties, excellent mechanical properties, high heat resistance, and high bondability to metals.

DESCRIPTION OF EMBODIMENTS

The thermoplastic polyester resin composition according to the present invention will be described in detail.

The thermoplastic polyester resin composition according to the present invention is a thermoplastic polyester resin composition comprising 100 parts by weight of (A) a non-liquid crystal thermoplastic polyester resin, 45 to 150 parts by weight of (B) a thermoplastic resin that is different from the non-liquid crystal thermoplastic polyester resin and has a dielectric loss tangent of not more than 0.005 when measured at a frequency of 5.8 GHz by the cavity resonance perturbation method (hereinafter sometimes referred to as the thermoplastic resin (B)), 2 to 20 parts by weight of (C) a compatibilizer having at least one reactive functional group selected from epoxy, acid anhydride, oxazoline, isocyanate, and carbodiimide groups (hereinafter sometimes referred to as the compatibilizer (C)), and 0.2 to 5 parts by weight of (D) at least one compound selected from tertiary amines, amidine compounds, organic phosphines and salts thereof, imidazoles, and boron compounds (hereinafter sometimes referred to as the compound (D)), wherein the ratio of the sum of the thermoplastic resin (B) and the compatibilizer (C) is in the range of 50 to 150 parts by weight and the weight ratio (B)/(C) of the thermoplastic resin (B) to the compatibilizer (C) is in the range of 8 to 50.

The non-liquid crystal thermoplastic polyester resin (A) has excellent injection molding properties, which help provide molded articles with excellent mechanical properties, but has limitations with respect to reduction of dielectric properties due to the presence of polar groups in its molecular structure. Thus, the addition of the thermoplastic resin with no polar groups but with excellently low dielectric properties (B) enables reduction of dielectric properties. Because the non-liquid crystal thermoplastic polyester resin (A) and the thermoplastic resin (B) are less compatible with each other, the compatibilizer (C) having the particular reactive functional group(s) is added. However, it has been observed that the effect to reduce dielectric properties was insufficient when the blending amounts of the thermoplastic resin (B) and the compatibilizer (C) were small, and that impairment of low dielectric properties occurred due to the presence of unreacted polar groups in the compatibilizer (C) when a large amount of the compatibilizer (C) was added in attempt to increase the compatibility. It has also been observed that a reduction of the blending amount of a high-dielectric reinforcement material, such as glass fibers, for further reduction of dielectric properties caused the resulting molded articles to have reduced mechanical properties, such as flexural modulus, and lower heat resistance, as well as to have lower stiffness. Therefore, the reactivity among the components (A), (B), and (C) can be controlled by varying the blending amounts of the thermoplastic resin with excellently low dielectric properties (B) and the compatibilizer (C) within particular ranges, and adding thereto the compound (D) having a particular structure, to improve the dispersibility of the component (B) in the component (A) and to reduce the ratio of residual unreacted groups to the total reactive functional groups of the components (A) and (C), which can in turn improve low dielectric properties, mechanical properties such as flexural modulus, heat resistance, and metal bondability in the resulting thermoplastic polyester resin composition.

In this respect, the thermoplastic polyester resin composition according to the present invention comprises a reaction product that is produced by the reaction among the components (A), (B), (C), and (D), and the reaction product is generated through a complex reaction scheme, which makes it unpractical to determine the structure of the reaction product. Thus, this invention is defined by the components to be blended.

The present invention uses (A) a non-liquid crystal polyester resin. The term "non-liquid crystal" as used herein refers to materials that are not anisotropic when the materials are melted. The non-liquid crystal thermoplastic polyester resin (A) used in the present invention is a polymer or copolymer that comprises, as the main structural unit, at least one residue selected from the group consisting of (1) a dicarboxylic acid or an ester-forming derivative thereof and a diol or an ester-forming derivative thereof, (2) a hydroxycarboxylic acid or an ester-forming derivative thereof, and (3) a lactone. By the phrase "as the main structural unit," it is meant that at least one residue selected from the group consisting of the components (1) to (3) comprises 50% by mole or more, preferably 80% by mole or more, of the total structural units. Among those, a polymer or copolymer that comprises residues of (1) a dicarboxylic acid or an ester-forming derivative thereof and of a diol or an ester-forming derivative thereof as the main structural units is preferred because of excellent mechanical properties and high heat resistance.

Examples of the above-described dicarboxylic acid or an ester-forming derivative thereof include aromatic dicarboxylic acids, such as terephthalic acid, isophthalic acid, phthalic acid, 2,6-naphthalenedicarboxylic acid, 1,5-naphthalenedicarboxylic acid, bis(p-carboxyphenyl)methane, 1,4-anthracenedicarboxylic acid, 1,5-anthracenedicarboxylic acid, 1,8-anthracenedicarboxylic acid, 2,6-anthracenedicarboxylic acid, 9,10-anthracenedicarboxylic acid, 4,4'-dicarboxydiphenyl ether, 5-tetrabutylphosphonium isophthalate, and monosodium 5-sulfoisophthalate; aliphatic dicarboxylic acids, such as oxalic acid, succinic acid, adipic acid, sebacic acid, azelaic acid, dodecanedioic acid, malonic acid, glutaric acid, and dimer acids; alicyclic dicarboxylic acids, such as 1,3-cyclohexanedicarboxylic acid and 1,4-cyclohexanedicarboxylic acid; and ester-forming derivatives thereof. These may be used in a combination of two or more.

Moreover, examples of the above-described diol or an ester-forming derivative thereof include aliphatic or alicyclic glycols having 2 to 20 carbon atoms, such as ethylene glycol, propylene glycol, 1,4-butanediol, neopentyl glycol, 1,5-pentanediol, 1,6-hexanediol, decamethylene glycol, cyclohexanedimethanol, cyclohexanediol, and dimer diols; long-chain glycols having a molecular weight of 200 to 100,000, such as polyethylene glycol, poly-1,3-propylene glycol, and polytetramethylene glycol; aromatic dioxy compounds, such as 4,4'-dihydroxybiphenyl, hydroquinone, t-butylhydroquinone, bisphenol A, bisphenol S, and bisphenol F; and ester-forming derivatives thereof. These may be used in a combination of two or more.

Examples of the polymer or copolymer that comprises a dicarboxylic acid or an ester-forming derivative thereof and a diol or an ester-forming derivative thereof as the structural unit include aromatic polyester resins, such as polyethylene terephthalate, polypropylene terephthalate, polybutylene terephthalate, polypropylene isophthalate, polybutylene isophthalate, polybutylene naphthalate, polypropylene (isophthalate/terephthalate), polybutylene (isophthalate/terephthalate), polypropylene (terephthalate/naphthalate), polybutylene (terephthalate/naphthalate), polybutylene (terephthalate/decane dicarboxylate), polypropylene (terephthalate/monosodium 5-sulfoisophthalate), polybutylene (terephthalate/monosodium 5-sulfoisophthalate), polypropylene terephthalate/polyethylene glycol, polybutylene terephthalate/polyethylene glycol, polypropylene terephthalate/polytetramethylene glycol, polybutylene terephthalate/polytetramethylene glycol, polypropylene (terephthalate/isophthalate)/polytetramethylene glycol, polybutylene (terephthalate/isophthalate)/polytetramethylene glycol, polybutylene (terephthalate/succinate), polypropylene (terephthalate/adipate), polybutylene (terephthalate/adipate), polypropylene (terephthalate/sebacate), polybutylene (terephthalate/sebacate), polypropylene (terephthalate/isophthalate/adipate), polybutylene (terephthalate/isophthalate/succinate), polybutylene (terephthalate/isophthalate/adipate), polybutylene (terephthalate/isophthalate/sebacate); and the like. The polymers and the copolymers may be used individually or in a combination of two or more. The slash sign (/) as used herein is used to denote a copolymer.

Among those, a polymer or copolymer that comprises a residue of an aromatic dicarboxylic acid or an ester-forming derivative thereof and a residue of an aliphatic diol or an ester-forming derivative thereof as the main structural units is more preferred, and a polymer or copolymer that comprises a residue of terephthalic acid, a naphthalenedicarboxylic acid, or an ester-forming derivative thereof and a residue of an aliphatic diol or an ester-forming derivative thereof selected from propylene glycol and 1,4-butanediol as the main structural units is even more preferred, in view of achieving more excellent mechanical properties and higher heat resistance.

Among those, at least one aromatic polyester resin selected from, for example, polyethylene terephthalate, polypropylene terephthalate, polybutylene terephthalate, polypropylene naphtha late, polybutylene naphthalate, polypropylene (isophthalate/terephthalate), polybutylene (isophthalate/terephthalate), polypropylene (terephthalate/naphthalate), polybutylene (adipate/terephthalate), polybutylene (terephthalate/sebacate), and polybutylene (terephthalate/naphthalate) is particularly preferred, and at least one aromatic polyester resin selected from polyethylene terephthalate, polybutylene terephthalate, polybutylene (isophthalate/terephthalate), polybutylene (decane dicarboxylate/terephthalate), polybutylene (terephthalate/naphthalate), and poly(butylene/ethylene terephthalate) is more preferred. At least one selected from the group consisting of polybutylene terephthalate, polybutylene (isophthalate/terephthalate), and polybutylene (terephthalate/sebacate) is even more preferred because of excellent balance between mechanical and molding properties. Additionally, these may be used in a combination of two or more at an arbitrary blending ratio.

As the non-liquid crystal polyester resin (A) used in the present invention, a mixture of polybutylene terephthalate and polyethylene terephthalate or of polybutylene (terephthalate/isophthalate) and polyethylene terephthalate is even more preferred in terms of low dielectric properties and metal bondability. Preferably, polybutylene terephthalate or polybutylene (terephthalate/isophthalate) at a mixing ratio of 60 to 95 parts by weight and polyethylene terephthalate at a mixing ratio of 5 to 40 parts by weight are blended, where the ratios of polybutylene terephthalate and polyethylene terephthalate or of polybutylene (terephthalate/isophthalate) and polyethylene terephthalate sum up to 100 parts by weight. When the blending amount of the polyethylene terephthalate is not less than 5 parts by weight and the blending amount of the polybutylene terephthalate or polybutylene (terephthalate/isophthalate) is not more than 95 parts by weight, metal bondability is increased in the resulting thermoplastic polyester resin composition. Preferably, polyethylene terephthalate at a ratio of not less than 9 parts by weight and polybutylene terephthalate or polybutylene (terephthalate/isophthalate) at a ratio of not more than 91 parts by weight are blended. On the other hand, when the blending amount of the polyethylene terephthalate resin is not more than 40 parts by weight and the blending amount of the polybutylene terephthalate or polybutylene (terephthalate/isophthalate) resin is not less than 60 parts by weight, a certain level of mechanical strength is maintained in the resulting thermoplastic polyester resin composition. Preferably, polyethylene terephthalate at a ratio of not more than 30 parts by weight and polybutylene terephthalate or polybutylene (terephthalate/isophthalate) at a ratio of not less than 70 parts by weight are blended.

The carboxyl group content in the non-liquid crystal thermoplastic polyester resin (A) used in the present invention is preferably not more than 50 eq/t from the viewpoint of moldability. In contrast, it is preferably not less than 10 eq/t in view of improving the dispersion of the thermoplastic resin (B) in the thermoplastic polyester resin composition, which is facilitated by reaction with the compatibilizer (C). The minimum carboxyl group content is 0 eq/t. In this respect, the carboxyl group content in the non-liquid crystal thermoplastic polyester resin (A) is a value determined by dissolving the non-liquid crystal thermoplastic polyester resin (A) in a mixed solvent of o-cresol/chloroform and then measuring the carboxyl group content through titration with an ethanolic potassium hydroxide solution.

The non-liquid crystal thermoplastic polyester resin (A) used in the present invention preferably has a weight-average molecular weight (Mw) of not less than 8,000 in view of achieving more excellent mechanical properties. Moreover, the weight-average molecular weight (Mw) is preferably not more than 500,000, more preferably not more than 300,000, even more preferably not more than 250,000, because of the capability to improve flowability. In the present invention, the weight-average molecular weight (Mw) of the non-liquid crystal thermoplastic polyester resin (A) is a value in terms of polymethyl methacrylate (PMMA) measured by gel permeation chromatography (GPC) using hexafluoroisopropanol as a solvent.

The non-liquid crystal thermoplastic polyester resin (A) used in the present invention can be produced by any known method such as polycondensation or ring-opening polymerization. The production process may be either a batch polymerization process or a continuous polymerization process, to which either a transesterification reaction or a direct polymerization reaction can be applied; preferably, a continuous polymerization process, more preferably a direct polymerization process, is employed from the viewpoint of productivity.

In cases where the non-liquid crystal thermoplastic polyester resin (A) used in the present invention is a polymer or copolymer obtained by a condensation reaction of a dicarboxylic acid or an ester-forming derivative thereof and a diol or an ester-forming derivative thereof, which are major components of the reaction, the polymer or copolymer can be produced by esterification or transesterification and subsequent polycondensation of the dicarboxylic acid or an ester-forming derivative thereof and the diol or an ester-forming derivative thereof.

Preferably, a polymerization catalyst is added to the reaction system during the esterification or transesterification and polycondensation reactions, to allow these reactions to proceed effectively. Specific examples of the polymerization catalyst include organotitanium compounds, such as titanic acid methyl ester, titanic acid tetra-n-propyl ester, titanic acid tetra-n-butyl ester, titanic acid tetraisopropyl ester, titanic acid tetraisobutyl ester, titanic acid tetra-tert-butyl ester, titanic acid cyclohexyl ester, titanic acid phenyl ester, titanic acid benzyl ester, titanic acid tolyl ester, or mixed esters thereof; tin compounds, such as dibutyl tin oxide, methylphenyl tin oxide, tetraethyl tin, hexaethyl ditin oxide, cyclohexahexyl ditin oxide, didodecyl tin oxide, triethyl tin hydroxide, triphenyl tin hydroxide, triisobutyl tin acetate, dibutyl tin diacetate, diphenyl tin laurate, monobutyl tin trichloride, dibutyl tin dichloride, tributyl tin chloride, dibutyl tin sulfide, butylhydroxy tin oxide, and alkyl stannates, such as methyl stannate, ethyl stannate, or butyl stannate; zirconia compounds, such as zirconium tetra-n-butoxide; antimony compounds, such as antimony trioxide and antimony triacetate; and the like. These may be used in a combination of two or more.

Among those polymerization catalysts, organotitanium compounds and tin compounds are preferred, and it is even more preferred that titanic acid tetra-n-butyl ester is used. The polymerization catalyst is preferably added in the range of 0.01 to 0.2 parts by weight to 100 parts by weight of the non-liquid crystal thermoplastic polyester resin (A).

The thermoplastic polyester resin composition according to the present invention is characterized by the non-liquid crystal thermoplastic polyester resin (A) in combination with a thermoplastic resin (B) that is different from the non-liquid crystal thermoplastic polyester resin and has a dielectric loss tangent of not more than 0.005 when measured at a frequency of 5.8 GHz by the cavity resonance perturbation method. As described above, the dielectric properties of a thermoplastic polyester resin composition can be reduced by the addition of the thermoplastic resin with excellently low dielectric properties (B).

Since the dielectric loss tangent of the thermoplastic resin with excellently low dielectric properties (B) according to the present invention is not more than 0.005 when the dielectric property is measured at a frequency of 5.8 GHz by the cavity resonance perturbation method, an effect to reduce dielectric properties is exerted on the thermoplastic polyester resin composition in a high-frequency environment. In this respect, the cavity resonance perturbation method is one type of resonance method suitable, among other methods of measuring dielectric properties, as a measurement method to analyze materials with a dielectric loss tangent value of less than 0.01 at a frequency in the range of around 1 to 20 GHz, and was a method of analyzing the dielectric properties of the component (B) of the present invention.

Preferably, the thermoplastic resin with excellently low dielectric properties (B) according to the present invention is at least one thermoplastic resin selected from polyolefin, liquid crystal polyester, polyphenylene sulfide, polystyrene, and polyphenylene ether resins. Preferably, the thermoplastic resin with excellently low dielectric properties (B) allows reduction of dielectric properties in the resulting thermoplastic polyester resin composition and simultaneously facilitates application of the resulting thermoplastic polyester resin composition to melt molding, such as injection molding, when selected from the above types of resins.

The thermoplastic resin with excellently low dielectric properties (B) according to the present invention preferably comprises at least (B-1) a polyolefin resin, among the above-described resins. The polyolefin resin (B-1) of the present invention is a thermoplastic resin obtained by polymerization or copolymerization of any of olefins, such as ethylene, propylene, butene, isoprene, and pentene. Specific examples of the polyolefin resin (B-1) used include homopolymers and copolymers, such as polyethylene, polypropylene, poly(l-butene), poly(l-pentene), and polymethyl pentene; ethylene/α-olefin copolymers; copolymers of ethylene with cyclic olefins, such as tetracyclododecene; block copolymers of conjugated dienes and vinyl aromatic hydrocarbons; and hydrides of those block copolymers. The ethylene/α-olefin copolymer as used herein refers to a copolymer of ethylene and at least one of α-olefins having 3 to 20 carbon atoms, and specific examples of the α-olefins having 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosen, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, and combinations thereof.

The polyolefin resin (B-1) of the present invention may be modified at one or both of the ends with functional groups, such as amino, isocyanate, hydroxy, mercapto, ureido, carboxyl, carboxylic anhydride, carboxylate ester, and metal carboxylate groups. However, the polyolefin resin is preferably unmodified, in view of reducing impairment of dielectric properties due to the presence of unreacted functional groups, or decrease in molding properties during melt molding due to increased melt viscosity in the resulting thermoplastic polyester resin composition.

The polyolefin resin (B-1) of the present invention is preferred to be at least one polyolefin resin selected, among others, from polyethylene, polypropylene, polymethyl pentene, and cyclic olefin polymers, and is more preferred to be at least one unmodified polyethylene selected from high-density polyethylenes, low-density polyethylenes, and linear low-density polyethylenes. Preferably, when the polyolefin resin is composed of any of the above-described resins, an excellent balance is achieved between mechanical properties and heat resistance in the resulting thermoplastic polyester resin composition. Moreover, two or more of the above-described resins may be used in combination for the polyolefin resin (B-1) of the present invention.

More preferably, the thermoplastic resin with excellently low dielectric properties (B) according to the present invention is composed of the above polyolefin resin (B-1) and (B-2) at least one thermoplastic resin selected from liquid crystal polyester, polyphenylene sulfide, polystyrene, and polyphenylene ether resins. Preferably, when the thermoplastic resin with excellently low dielectric properties (B) according to the present invention is composed of the above components (B-1) and (B-2), the components (B-1) and (B-2) are easily dispersed forming fine patterns in a matrix phase composed of the non-liquid crystal thermoplastic polyester resin (A), which improves mechanical properties and heat resistance in the resulting thermoplastic polyester resin composition, even in cases where the blending amount of the component (B) is increased for reducing the dielectric properties. It is also preferable because the polyolefin resin (B-1) and the thermoplastic resin (B-2) can impart properties derived therefrom, such as low dielectric properties and heat resistance, to the thermoplastic polyester resin composition, respectively. Additionally, multiple types of resins may be used in combination for the component (B-1), and likewise for the component (B-2).

The liquid crystal polyester resin (B-2) of the present invention is a polyester resin that becomes anisotropic when it is melted. Examples of structural units for the liquid crystal polyester resin include aromatic oxycarbonyl units, aromatic dioxy units, aromatic and/or aliphatic dicarbonyl units, alkylenedioxy units, and aromatic iminoxy units.

The liquid crystal polyester resin (B-2) of the present invention is preferably a semi-aromatic liquid crystal polyester resin having a structural unit derived from an aliphatic diol. Preferably, when the liquid crystal polyester resin is such a semi-aromatic liquid crystal polyester resin, the liquid crystal polyester resin is easily dispersed in a matrix phase composed of the non-liquid crystal thermoplastic polyester resin (A), which improves the mechanical properties in the resulting thermoplastic polyester resin composition.

The liquid crystal polyester resin (B-2) of the present invention preferably has a melting point of 200° C. or higher, more preferably 250° C. or higher, from the viewpoint of heat resistance. On the other hand, the liquid crystal polyester resin (B-2) preferably has a melting point of 350° C. or lower, more preferably 330° C. or lower, in view of the manufacturability and the moldability of the resulting thermoplastic polyester resin composition. The melting point of the liquid crystal polyester resin can be determined by the endothermic peak temperature observed from differential scanning calorimetry studies.

Moreover, the thermoplastic resin with excellently low dielectric properties (B) according to the present invention may comprise a polyphenylene sulfide resin as the component (B-2).

The polyphenylene sulfide resin (B-2) of the present invention is a polymer having a repeating unit represented by the following structural formula. From the viewpoint of heat resistance, the content of the repeating unit represented by the following structural formula is preferably 70% by mole or more, more preferably 90% by mole or more:

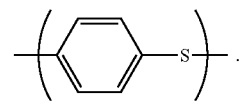

Moreover, repeating units, for example, represented by any of the following structural formulas may comprise less than roughly 30% by mole of the repeating units in the polyphenylene sulfide resin (B-2). A partial presence of any of those repeating units below results in reduction of the melting point of the polyphenylene sulfide resin, and is thus advantageous from the viewpoint of moldability:

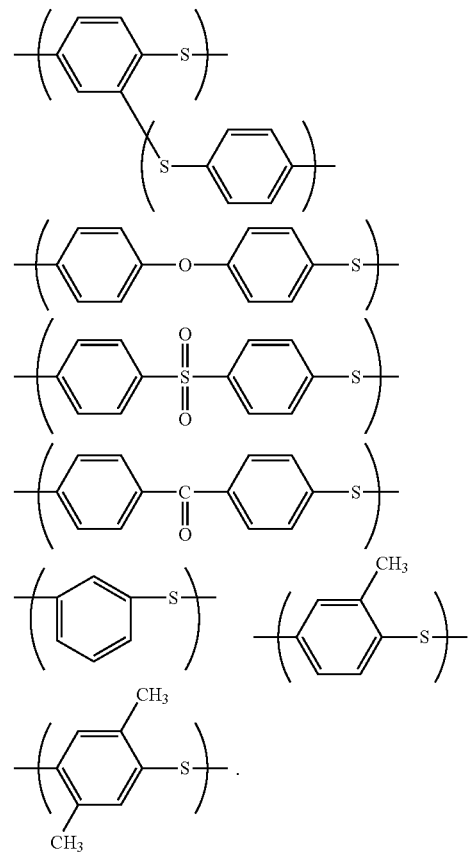

The polyphenylene sulfide resin (B-2) of the present invention may be used after self-crosslinking using a cross-linking agent to form a higher-order structure. On the other hand, it may be a polyphenylene sulfide resin that is not crosslinked for formation of a higher-order structure but has a substantially linear structure, in view of improving mechanical properties, such as impact strength.

Moreover, the thermoplastic resin with excellently low dielectric properties (B) according to the present invention may comprise a polystyrene resin as the component (B-2).

Examples of the polystyrene resin (B-2) of the present invention include polystyrene, styrene/acrylonitrile copolymers, and rubber-modified styrene-based resins. Specific examples of the rubber-modified styrene-based resins include high impact polystyrene (HIPS), ABS resins (acrylonitrile/butadiene/styrene copolymers), AAS resins (acrylonitrile/acrylate/styrene copolymers), and AES resins (acrylonitrile/ethylene.propylene/styrene copolymers).

The polystyrene resin (B-2) of the present invention may have a syndiotactic structure, which is formed by polymerization using a metallocene catalyst.

Moreover, the thermoplastic resin with excellently low dielectric properties (B) according to the present invention may comprise a polyphenylene ether resin as the component (B-2).

Polyphenylene ether and modified polyphenylene ether, which is an alloy of polyphenylene ether and another resin, are examples of the polyphenylene ether resin (B-2) of the present invention. Examples of a resin used as an alloying partner for the modified polyphenylene ether include rubber-modified styrene-based resins, polyamide, polypropylene, and polyphenylene sulfide.

The polyphenylene ether resin (B-2) of the present invention may be modified using an olefin compound substituted with a functional group(s), such as acid anhydride and imide groups.

The thermoplastic resin with excellently low dielectric properties (B) according to the present invention preferably comprises, among the above-described components (B-2), a liquid crystal polyester resin from the viewpoint of heat resistance, or a polystyrene resin from the viewpoint of dimensional stability.

The blending amount of the thermoplastic resin with excellently low dielectric properties (B) according to the present invention is in the range of 45 to 150 parts by weight with respect to 100 parts by weight of the non-liquid crystal thermoplastic polyester resin (A). In cases where the blending amount of the component (B) is less than 45 parts by weight, the reduction of dielectric properties is insufficient in the resulting thermoplastic polyester resin composition. The blending amount of the component (B) is more preferably not less than 60 parts by weight. On the other hand, when the blending amount of the component (B) is more than 150 parts by weight, reduction of mechanical properties and heat resistance occurs. The blending amount of the component (B) is more preferably not more than 120 parts by weight, even more preferably not more than 100 parts by weight.

When the thermoplastic resin with excellently low dielectric properties (B) according to the present invention is composed of the polyolefin resin (B-1) and (B-2) at least one thermoplastic resin selected from liquid crystal polyester, polyphenylene sulfide, polystyrene, and polyphenylene ether resins, the blending amount of the component (B-1) is preferably in the range of 10 to 140 parts by weight with respect to 100 parts by weight of the non-liquid crystal thermoplastic polyester resin (A). The blending amount of the component (B-1) is more preferably not less than 15 parts by weight, even more preferably not less than 30 parts by weight, from the viewpoint of low dielectric properties. On the other hand, the blending amount of the component (B-1) is more preferably not more than 100 parts by weight, even more preferably not more than 75 parts by weight, from the viewpoint of mechanical properties and heat resistance. Additionally, the blending amount of the component (B-2) is preferably in the range of 10 to 140 parts by weight with respect to 100 parts by weight of the non-liquid crystal thermoplastic polyester resin (A). The blending amount of the component (B-2) is more preferably not less than 15 parts by weight, even more preferably not less than 30 parts by weight, from the viewpoint of low dielectric properties and heat resistance. On the other hand, the blending amount of the component (B-2) is more preferably not more than 100 parts by weight, even more preferably not more than 75 parts by weight, from the viewpoint of mechanical properties.

The thermoplastic polyester resin composition according to the present invention is characterized by the non-liquid crystal thermoplastic polyester resin (A) in further combination with (C) a compatibilizer having at least one reactive functional group selected from epoxy, acid anhydride, oxazoline, isocyanate, and carbodiimide groups. As described above, the addition of the compatibilizer (C) having the above reactive functional group(s) increases the compatibility between the non-liquid crystal thermoplastic polyester resin (A) and the thermoplastic resin with excellently low dielectric properties (B), which can allow the component (B) to be finely dispersed in a matrix phase composed of the component (A) during melt kneading and molding and consequently improve mechanical properties, heat resistance, and metal bondability.

The compatibilizer (C) of the present invention is a compound having at least one reactive functional group selected from epoxy, acid anhydride, oxazoline, isocyanate, and carbodiimide groups, and may be a monomer or a polymer, in which the reactive functional group is linked to the main chain, the side chain, or one or both of the ends in the molecule. The polymer may be classified as a block copolymer, a graft copolymer, or a random copolymer. Additionally, the compatibilizer may have a functional group(s) other than the above reactive functional groups. Such compatibilizers may be used in a combination of two or more. If the compatibilizer (C) of the present invention has a dielectric loss tangent of not more than 0.005 when measured at a frequency of 5.8 GHz by the cavity resonance perturbation method, and is a thermoplastic resin having any of the above-described reactive functional groups, the compatibilizer (C) is considered as a component (B) as described above.

The compatibilizer (C) of the present invention is preferred to be a compatibilizer having an epoxy group, from the viewpoint of reactivity control. The compound having an epoxy group as a reactive functional group may be any compound selected from the group consisting of glycidyl ether, glycidyl ester, glycidyl amine, glycidyl imide, and alicyclic epoxy compounds. Among those, a glycidyl-containing ethylene copolymer, which is a glycidyl ester compound, is particularly preferred.

The glycidyl-containing ethylene copolymer of the present invention is preferably a copolymer of ethylene and a α,β-unsaturated glycidyl ester. Examples of the α,β-unsaturated glycidyl ester can include glycidyl acrylate, glycidyl methacrylate, glycidyl ethacrylate, and glycidyl itaconate. These may be used in a combination of two or more. Among those, glycidyl methacrylate is preferably used.

In the glycidyl-containing ethylene copolymer of the present invention, the blending ratios of the ethylene structural unit and the α,β-unsaturated glycidyl ester structural unit are preferably in the range of 60 to 98% by weight and in the range of 2 to 40% by weight, respectively, with respect to 100% by weight of the total components of the copolymer. Particularly, the blending ratios of the ethylene structural unit and the α,β-unsaturated glycidyl ester structural unit are more preferably in the range of 86 to 95% by weight and in the range of 5 to 14% by weight, respectively, in view of the mechanical properties and the heat resistance of the resulting thermoplastic polyester resin composition.

Moreover, the glycidyl-containing ethylene copolymer may be a copolymer obtained by copolymerization of ethylene, an α, β-unsaturated glycidyl ester, and, furthermore, an α, β-unsaturated acid ester. Examples of the α, β-unsaturated acid ester include methyl, ethyl, propyl, isopropyl, n-butyl, isobutyl, and tert-butyl esters of acrylic and methacrylic acids.

Preferably, the glycidyl-containing ethylene copolymer of the present invention has an epoxy equivalent weight of 700 to 7500 g/eq. More preferably, the glycidyl-containing ethylene copolymer has an epoxy equivalent weight of not more than 5000 g/eq in view of reducing decrease in moldability and impairment of dielectric properties, which are caused by the presence of residual unreacted groups. On the other hand, an epoxy equivalent weight of not less than 1000 g/eq in view of improving mechanical properties and heat resistance by helping the fine dispersion of the component (B).

The blending amount of the compatibilizer (C) of the present invention is in the range of 2 to 20 parts by weight with respect to 100 parts by weight of the non-liquid crystal thermoplastic polyester resin (A). In cases where the blending amount of the component (C) is less than 2 parts by weight, the component (B) is coarsely dispersed in a matrix phase composed of the non-liquid crystal thermoplastic polyester resin (A), and the mechanical properties, heat resistance, and metal bondability of the resulting thermoplastic polyester resin composition are reduced. The blending amount of the compatibilizer (C) is more preferably not less than 3 parts by weight, even more preferably not less than 5 parts by weight. On the other hand, in cases where the blending amount of the component (C) is more than 20 parts by weight, impairment of dielectric properties occurs due to the presence of unreacted reactive functional groups from the compatibilizer. The blending amount of the compatibilizer (C) is more preferably not more than 15 parts by weight, even more preferably not more than 10 parts by weight.

The thermoplastic polyester resin composition according to the present invention is characterized by the non-liquid crystal thermoplastic polyester resin (A) in further combination with (D) at least one compound selected from tertiary amines, amidine compounds, organic phosphines and salts thereof, imidazoles, and boron compounds (hereinafter sometimes referred to as the compound (D)). When the above compound (D) is added, the component (D) containing a nitrogen, phosphorus, or boron element(s) acts as a reaction catalyst to promote a reaction between carboxyl groups from the non-liquid crystal thermoplastic polyester (A) and reactive functional groups in the compatibilizer (C). Thus, the ratio of residual unreacted groups to the total reactive functional groups of the components (A) and (C) is reduced in the resulting thermoplastic polyester resin composition, and the dispersibility of the thermoplastic resin with excellently low dielectric properties (B) is also improved. Consequently, the metal bondability can be increased. Particularly, the addition of the compound (D) can specifically increase metal bondability, while keeping the low dielectric properties, the mechanical properties, and the heat resistance unchanged, in cases where the blending amount of the thermoplastic resin with excellently low dielectric properties (B) is increased in an attempt for further reduction of dielectric properties.

Examples of the tertiary amines include trimethylamine, triethylamine, tripropylamine, diisopropylethylamine, pyridine, 4-(dimethylamino)pyridine, benzyldimethylamine, 2-(dimethylaminomethyl)phenol, 2,4,6-tris(diaminomethyl)phenol.

Examples of the amidine compounds include 1,8-diazabicyclo[5.4.0]-7-undecene, 1,5-diazabicyclo[4.3.0]-5-nonene, 5,6-dibutylamino-1,8-diazabicyclo[5.4.0]-7-undecene, and 7-methyl-1,5,7-triazabicyclo[4.4.0]-5-decene. Additionally, any of the above amidine compounds can be used in the form of an inorganic or organic acid salt, such as the tetraphenylborate salt of 1,8-diazabicyclo[5.4.0]-7-undecene.

Examples of the organic phosphines and salts thereof include triphenylphosphine, tri(ortho-tolyl)phosphine, tri(meta-tolyl)phosphine, tri(para-tolyl)phosphine, tris-4-methoxyphenylphosphine, tri(cyclohexyl)phosphine, tri(n-butyl)phosphine, tri(tert-butyl)phosphine, tetrabutylphosphonium bromide, methyltriphenylphosphonium bromide, ethyltriphenylphosphonium bromide, butyltriphenylphosphonium bromide, benzyltriphenylphosphonium bromide, tetraphenylphosphonium bromide, tetraphenylphosphonium tetraphenylborate, triphenylphosphine triphenylborane, and triphenylphosphine-1,4-benzoquinone adduct.

Examples of the imidazoles include 2-methylimidazole, 2-aminoimidazole, 2-methyl-1-vinylimidazole, 2-ethyl-4-methylimidazole, 2-heptadecylimidazole, 2-phenylimidazole, 2-undecylimidazole, 1-allylimidazole, 1-cyanoethyl-2-methylimidazole, 1-cyanoethyl-2-undecylimidazole, 1-cyanoethyl-2-undecylimidazolium trimellitate, 1-benzyl-2-methylimidazole, 1-cyanoethyl-2-ethyl-4-methylimidazole, 1-cyanoethyl-2-phenylimidazolium trimellitate, 1-dodecyl-2-methyl-3-benzylimidazolium chloride, 2-methylimidazolium isocyanurate, 2-phenylimidazolium isocyanurate, 2,4-diamino-6-[2-(2-methyl-1-imidazolyl)ethyl]-1,3,5-triazine, 1,3-dibenzyl-2-methylimidazolium chloride, 1,3-diaza-2,4-cyclopentadiene, 1-cyanoethyl-2-phenyl-4,5-di(cyanoethoxymethyl)imidazole, 2-phenyl-4,5-dihydroxymethylimidazole, 2-phenyl-4-methyl-5-hydroxymethylimidazole, and 2,4-diamino-6-[2-(2-undecyl-1-imidazolyl)ethyl]-1,3,5-triazine.

Examples of the boron compounds include boron trifluoride n-hexylamine, boron trifluoride monoethylamine, boron trifluoride benzylamine, boron trifluoride diethylamine, boron trifluoride piperidine, boron trifluoride triethylamine, boron trifluoride aniline, boron tetrafluoride n-hexylamine, boron tetrafluoride monoethylamine, boron tetrafluoride benzylamine, boron tetrafluoride diethylamine, boron tetrafluoride piperidine, boron tetrafluoride triethylamine, and boron tetrafluoride aniline.

These may be mixed in a combination of two or more as the component (D) of the present invention.

The component (D) of the present invention is preferably a compound having the structure represented by the following chemical formula (1):

(wherein $R_1$ to $R_4$ are selected from hydrogen, $C_{1-12}$ alkyl groups, phenyl group, and benzyl group, and may be the same or different; A represents a phosphorus or nitrogen atom; X represents a halogen atom; n is 0 or 1).

Further preferably, the compound has the structure represented by the above formula (1), wherein any one or more of $R_1$ to $R_4$ represent phenyl or benzyl, and A represents phosphorus, and X represents chlorine or bromine, and n is 1.

When the component (D) of the present invention has the above preferred structure, the component (B) is finely dispersed in a matrix phase composed of the non-liquid crystal thermoplastic polyester resin (A), which can in turn improve low dielectric properties, mechanical properties, heat resistance, and metal bondability in the resulting thermoplastic polyester resin composition, even in cases where a large amount of the thermoplastic resin with excellently low dielectric properties (B) is blended, or where a small amount of the compatibilizer (C) is blended.

The blending amount of the at least one compound (D) selected from tertiary amines, amidine compounds, organic phosphines and salts thereof, imidazoles, and boron compounds according to the present invention is in the range of 0.2 to 5 parts by weight with respect to 100 parts by weight of the non-liquid crystal thermoplastic polyester resin (A). In cases where the blending amount of the component (D) is less than 0.2 parts by weight, the component (B) is coarsely dispersed, and the mechanical properties, heat resistance, and metal bondability of the resulting thermoplastic polyester resin composition are reduced. The blending amount of the compound (D) is more preferably not less than 0.25 parts by weight, even more preferably not less than 0.3 parts by weight. On the other hand, in cases where the blending amount of the component (D) is more than 5 parts by weight, reduction of molecular weight is promoted in the non-liquid crystal thermoplastic polyester resin (A). The blending amount of the compound (D) is more preferably not more than 3 parts by weight, even more preferably not more than 1 part by weight.

The summed blending amount of the thermoplastic resin with excellently low dielectric properties (B) and the compatibilizer (C) according to the present invention is in the range of 50 to 150 parts by weight with respect to 100 parts by weight of the non-liquid crystal thermoplastic polyester resin (A). The weight ratio (B)/(C) of the thermoplastic resin (B) to the compatibilizer (C) in the blend is in the range of 8 to 50. When the blending amounts of the components (B) and (C) satisfy the above relation, a thermoplastic polyester resin composition with low dielectric properties, excellent mechanical properties, and high heat resistance can be obtained.

In cases where the summed blending amounts of the components (B) and (C) is less than 50 parts by weight, the reduction of dielectric properties is insufficient in the resulting thermoplastic polyester resin composition. The summed blending amounts of the components (B) and (C) is more preferably not less than 60 parts by weight, even more preferably not less than 70 parts by weight. On the other hand, in cases where the summed blending amounts of the components (B) and (C) is more than 150 parts by weight, mechanical properties and metal bondability are reduced in the resulting thermoplastic polyester resin composition. The summed blending amounts of the components (B) and (C) is more preferably not more than 120 parts by weight, even more preferably not more than 100 parts by weight.

In cases where the weight ratio (B)/(C) of the component (B) to the component (C) in the blend is less than 8, the amount of unreacted reactive functional groups derived from the compatibilizer (C) is increased in the resulting thermoplastic polyester resin composition, and impairment of low dielectric properties consequently occurs. Additionally, the increased amount of the flexible component (C) causes a decrease in stiffness, which results in reduction of mechanical properties, such as flexural modulus. The weight ratio (B)/(C) is more preferably not less than 12, even more preferably not less than 15. On the other hand, in cases where the weight ratio (B)/(C) is more than 50, the compatibility of the thermoplastic resin with excellently low dielectric properties (B) is poor, which reduces the dispersibility of the component (B) in the resulting thermoplastic polyester resin composition, and leads to reduced mechanical properties, lower heat resistance, and lower metal bondability. The weight ratio (B)/(C) is more preferably not more than 30, even more preferably not more than 24, particularly preferably not more than 20.

Preferably, when the polyolefin resin (B-1) and the glycidyl-containing ethylene copolymer (C-1) are respectively used as the thermoplastic resin (B) and the compatibilizer (C) having at least one reactive functional group selected from epoxy, acid anhydride, oxazoline, isocyanate, and carbodiimide groups in the thermoplastic polyester resin composition according to the present invention, the ratio of the sum of the polyolefin resin (B-1) and the glycidyl-containing ethylene copolymer (C-1) is in the range of 20 to 65% by volume, where the ratio of the sum of the non-liquid crystal thermoplastic polyester resin (A), the polyolefin resin (B-1), and the glycidyl-containing ethylene copolymer (C-1) accounts for 100% by volume.

When the volume fraction of the components (B-1) and (C-1) is within the above range, a thermoplastic polyester resin composition in which an excellent balance is achieved among low dielectric properties, mechanical properties, and heat resistance can be obtained. In cases where the above volume fraction is less than 20% by volume, impairment of low dielectric properties occurs in the resulting thermoplastic polyester resin composition. The above volume fraction is preferably not less than 30% by volume, more preferably not less than 40% by volume. In contrast, in cases where the above volume fraction is more than 65% by volume, metal bondability is reduced, as well as mechanical properties, heat resistance, and moldability are reduced. The above volume fraction is preferably not more than 63% by volume, more preferably not more than 60% by volume, even more preferably not more than 55% by volume. The above volume fraction can be calculated based on the blending ratio and specific gravity of each component.

Preferably, the cold crystallization temperature measured in the thermoplastic polyester resin composition according to the present invention by differential scanning calorimetry satisfies the following requirements (2) to (4):

$$3 \leq T_{CB'} - T_{CB} < 20 \qquad (2);$$

$$|T_{CA} - T_{CB}| \geq 20 \qquad (3);$$

$$|T_{CA'} - T_{CB'}| \geq 20 \qquad (4),$$

wherein $T_{CA}$ (° C.) is the cold crystallization temperature ($T_{CA}$) derived from the non-liquid crystal thermoplastic polyester resin (A) in the thermoplastic polyester resin composition, and $T_{CB}$ (° C.) is the cold crystallization temperature ($T_{CB}$) derived from the polyolefin resin (B-1) in the thermoplastic polyester resin composition, and $T_{CA'}$ (° C.) is the cold crystallization temperature ($T_{CA'}$) observed when the measurement is performed on the component (A)

alone, and $T_{CB'}$ (° C.) is the cold crystallization temperature ($T_{CB}$) observed when the measurement is performed on the component (B-1) alone.

Preferably, when the cold crystallization temperature derived from the polyolefin resin (B-1) is within the above range, the reaction between the component (A) and the component (C) is facilitated in the thermoplastic polyester resin composition, which results in fine dispersion of the component (B-1) and leads to excellent mechanical properties and high heat resistance in the resulting thermoplastic polyester resin composition.

In cases where the value obtained by subtracting $T_{CB}$ from $T_{CB'}$ is not less than 3° C. and less than 20° C., the dispersibility of the polyolefin resin (B-1) in the non-liquid crystal thermoplastic polyester resin (A) is high, which leads to excellent mechanical properties, high heat resistance, and high bondability to metals in the resulting thermoplastic polyester resin composition. The above value is more preferably not less than 5° C., even more preferably not less than 7° C. On the other hand, in cases where the value obtained by subtracting $T_{CB}$ from $T_{CB'}$ is not less than 20° C., the component (B-1) is degenerated, which results in reduction of mechanical properties and heat resistance in the resulting thermoplastic polyester resin composition. Thus, this condition is not preferable.

Preferably, when the difference between $T_{CB}$ and $T_{CA}$ is not less than 20° C., the solidification properties of the resulting thermoplastic polyester resin composition is well controlled, and the dispersibility of the component (B-1) is improved. Since the difference between $T_{CB}$ and $T_{CA}$ is calculated as an absolute value, one of the temperatures represented by $T_{CB}$ and $T_{CA}$ may be higher than the other. The difference between $T_{CB}$ and $T_{CA}$ is more preferably not less than 35° C., even more preferably not less than 70° C. On the other hand, the difference between $T_{CB}$ and $T_{CA}$ is preferably not more than 200° C.

Moreover, the difference between the cold crystallization temperature measured for the component (B-1) alone ($T_{CB'}$) and the cold crystallization temperature measured for the component (A) alone ($T_{CA'}$) is preferably not less than 20° C. Preferably, when the difference between $T_{CB'}$ and $T_{CA'}$ is not less than 20° C., a thermoplastic polyester resin composition with well controlled crystallinity is easily obtained. Since the difference between $T_{CB'}$ and $T_{CA'}$ is calculated as an absolute value, one of the temperatures represented by $T_{CB'}$ and $T_{CA'}$ may be higher than the other. The difference between $T_{CB'}$ and $T_{CA'}$ is more preferably not less than 35° C., even more preferably not less than 70° C. On the other hand, the difference between $T_{CB'}$ and $T_{CA'}$ is preferably not more than 200° C.

With respect to the relationship between $T_{CB''}$ and $T_{CA''}$, the temperature measured for the component (A) alone, $T_{CA''}$, may be higher than the temperature measured for the component (B-1) alone, $T_{CB''}$, and vice versa. However, the relationship between the temperature derived from the component (A), $T_{CA}$, in the resulting thermoplastic polyester and the temperature derived from the component (B-1), $T_{CB}$, in the same polyester is consistent with the order of the temperatures measured for the component (A) alone, $T_{CA''}$, and for the component (B-1) alone, $T_{CB''}$, when the resulting thermoplastic polyester has crystalline properties typical for thermoplastic polyester resin compositions.

Since the thermoplastic polyester resin composition according to the present invention comprises the non-liquid crystal thermoplastic polyester (A) and the polyolefin resin (B-1) together with the compatibilizer (C) having a specified reactive functional group(s) and the compound (D) having a specified structure, the reaction between the component (A) and the component (C) is facilitated and the component (B-1) is finely dispersed, which can help providing a thermoplastic polyester resin composition having $T_{CA}$ and $T_{CB}$ values within the above range.

In this respect, $T_{CA}$, $T_{CB}$, $T_{CA'}$, and $T_{CB'}$ can be determined as follows. In differential scanning calorimetry, the thermoplastic polyester resin composition is heated from room temperature to a temperature of the melting point of the non-liquid crystal thermoplastic polyester resin (A)+20° C. at a temperature rising rate of 20° C./min, kept at the same temperature for 5 minutes, and then cooled to room temperature at a temperature dropping rate of 20° C./min, and the observed crystallization exothermic peak temperature derived from the non-liquid crystal thermoplastic polyester resin (A) is designated as $T_{CA}$, and the observed crystallization exothermic peak temperature derived from the polyolefin resin (B-1) is designated as $T_{CB}$. Additionally, the crystallization exothermic peak temperature is measured for the non-liquid crystal thermoplastic polyester resin (A) alone or for the polyolefin resin (B-1) alone in the same manner as above, and the obtained value is designated as $T_{CA'}$ or $T_{CB''}$, except that the highest temperature reached after heating is changed to a temperature of the melting point of the non-liquid crystal thermoplastic polyester resin (A) or the polyolefin resin (B-1)+20° C.

In the thermoplastic polyester resin composition according to the present invention, the concentration of epoxy groups in the thermoplastic polyester resin composition is preferably in the range of 10 to 30 eq/t. Preferably, in cases where the concentration of epoxy groups in the thermoplastic polyester resin composition is not less than 10 eq/t, the amount of the component (C) required for forming a compatible blend of the component (A) and the component (B) is sufficient enough to allow the component (B) to be finely dispersed in the component (A), which leads to excellent mechanical properties, high heat resistance, and high bondability to metals in the resulting thermoplastic polyester resin composition. The concentration of epoxy groups is more preferably not less than 15 eq/t. Preferably, on the other hand, in cases where the concentration of epoxy groups in the thermoplastic polyester resin composition is not more than 30 eq/t, reduction of mechanical properties during mold residence time, which is caused by an excessive reaction induced by unreacted epoxy groups, is prevented. The concentration of epoxy groups is more preferably not more than 27 eq/t. The concentration of epoxy groups in the thermoplastic polyester composition can be calculated by dissolving the thermoplastic polyester resin composition in a mixed solution of o-cresol/chloroform (2/1, vol/vol), adding acetic acid and a solution of triethylammonium bromide in acetic acid to the resin solution, and then performing a potentiometric titration with a 0.1 mol/L solution of perchloric acid in acetic acid.

Preferably, in the thermoplastic polyester resin composition according to the present invention, island phases composed of the thermoplastic resin with excellently low dielectric properties (B) and having a dispersion diameter of 0.01 to 10 μm are dispersed in a matrix phase composed of the non-liquid crystal thermoplastic polyester resin (A). Preferably, when the dispersion diameter of the component (B) is within the above range, mechanical properties and heat resistance are improved in the resulting thermoplastic polyester resin composition. In addition, dimensional stability can also be improved in molded articles, which is preferred. The dispersion diameter of the component (B) is preferred to be not less than 0.1 μm, from the viewpoint of productivity.

On the other hand, the dispersion diameter of the component (B) is more preferably not more than 7 μm, even more preferably not more than 5 μm, from the viewpoint of mechanical properties and heat resistance. In cases where the component (B) is composed of two or more kinds of island phases, any of the island phases of the component (B) preferably has a dispersion diameter within the above range.

In this respect, the dispersion diameter of the component (B) is determined by the following method. A molded article made from the thermoplastic polyester resin composition is cut in the middle along the direction perpendicular to the resin flow direction, and the resulting cross-section is observed using a scanning electron microscope at a magnification of around 1,000 to 20,000 times to determine the average value of the maximum and minimum diameters in each of 50 arbitrary dispersed phases composed of the component (B), and the mean of the averaged values is defined as the dispersion diameter of the component (B) in the thermoplastic polyester resin composition. During the observation under a scanning electron microscope, the component (B) may be subjected to elemental mapping analysis based on energy dispersive X-ray spectroscopy (EDX).

The thermoplastic polyester resin composition according to the present invention may further comprise (E) a metal salt of an organic phosphate ester. The addition of the metal salt of an organic phosphate ester (E) can further improve low dielectric properties, mechanical properties, and heat resistance.

As the metal salt of an organic phosphate ester (E), a compound commonly used as a nucleating agent for resin compositions can be used. Specific examples of the metal salt of an organic phosphate ester can include sodium 2,2'-methylene-bis(4-methyl-6-t-butylphenyl)phosphate, sodium 2,2'-methylene-bis(4,6-di-t-butylphenyl)phosphate, lithium 2,2'-methylene-bis(4,6-di-t-butylphenyl)phosphate, sodium 2,2'-ethylidene-bis(4,6-di-t-butylphenyl)phosphate, lithium 2,2'-ethylidene-bis(4,6-di-t-butylphenyl)phosphate, aluminium hydroxy-bis[2,2'-methylene-bis(4,6-di-t-butylphenyl)phosphate], aluminium hydroxy-bis[2,2'-methylene-bis(4-methyl-6-t-butylphenyl)phosphate], and aluminium hydroxy-bis[2,2'-ethylidene-bis(4,6-di-t-butylphenyl)phosphate]. Additionally, these may be used in a combination of two or more as the above metal salt of an organic phosphate ester used in the present invention.

As the metal salt of an organic phosphate ester (E) used in the present invention, a commercially available compound may be used, and examples of the commercially available compound include "ADK STAB" (registered trademark) NA-11, NA-21, and NA-71 manufactured by ADEKA Corp.

The blending amount of the metal salt of an organic phosphate ester (E) used in the present invention is preferably in the range of 0.01 to 5 parts by weight with respect to 100 parts by weight of the non-liquid crystal thermoplastic polyester resin (A). When not less than 0.01 parts by weight of the metal salt of an organic phosphate ester (E) are added, lower dielectric properties, higher mechanical strength, and higher heat resistance can be achieved. The blending amount of the metal salt of an organic phosphate ester is more preferably not less than 0.05 parts by weight, even more preferably not less than 0.1 parts by weight. On the other hand, when not more than 5 parts by weight of the metal salt of an organic phosphate ester (E) are added, higher toughness can be achieved. The blending amount of the metal salt of an organic phosphate ester is more preferably not more than 2 parts by weight, even more preferably not more than 1 part by weight.

The thermoplastic polyester resin composition according to the present invention preferably further comprise (F) an inorganic filler. Higher mechanical strength and higher heat resistance can be achieved by the presence of the inorganic filler (F).

Specific examples of the inorganic filler (F) include fibrous, whisker, needle, granular, powder and lamellar inorganic fillers, including, more specifically, glass fibers, PAN- or pitch-based carbon fibers, metal fibers such as stainless steel, aluminum, and bras fibers, organic fibers such as aromatic polyamide and liquid crystal polyester fibers, plaster fibers, ceramic fibers, asbestos fibers, zirconia fibers, alumina fibers, silica fibers, titanium oxide fibers, silicon carbide fibers, rock wool, potassium titanate whisker, barium titanate whisker, aluminum borate whisker, silicon nitride whisker, calcium sulfate whisker, needle-shaped titanium oxide, glass beads, milled fibers, glass flakes, wollastonite, silica, kaolin, talc, calcium carbonate, zinc oxide, magnesium oxide, aluminum oxide, mixtures of magnesium oxide and aluminum oxide, powdered silicate minerals, aluminum silicate, silicon oxide, smectite-group clay minerals (montmorillonite, hectorite), vermiculite, mica, fluor-taeniolite, zirconium phosphate, titanium phosphate, and dolomite. The surface of the above inorganic filler used in the present invention may be treated with any known coupling agent (for example, silane-based coupling agent, titanate-based coupling agent, or the like) or any other surface treatment agent. Additionally, these may be used in a combination of two or more as the above inorganic filler used in the present invention.

Glass fibers are preferred as the inorganic filler (F) used in the present invention, particularly from the viewpoint of mechanical strength and heat resistance. The glass fibers are chopped-strand-type or roving-type glass fibers, and glass fibers that are surface-treated with a silane coupling agent, such as an amino-silane compound or an epoxy-silane compound, and/or with a sizing agent containing, for example, urethane, an acrylate-based copolymer such as an acrylate/styrene copolymer, a maleic anhydride-based copolymer such as methyl acrylate/methyl methacrylate/maleic anhydride copolymer, vinyl acetate, or one or more epoxy compounds such as bisphenol A diglycidyl ether and a Novolac-type epoxy compound are preferably used.

The inorganic filler (F) used in the present invention is even more preferably glass fiber which is treated with a sizing agent containing, for example, an epoxy compound because such glass fibers are highly reactive with the non-liquid crystal thermoplastic polyester resin (A), which leads to excellent mechanical properties and high heat resistance in the resulting thermoplastic polyester resin composition. The silane coupling agent and/or the sizing agent may be mixed with an emulsion and then used. Additionally, it is preferable that the reinforcement fibers normally has a fiber diameter of 1 to 30 μm. The minimum value of the fiber diameter is preferably 5 μm, in view of the dispersibility of the glass fibers in the thermoplastic polyester resin composition. The maximum value of the fiber diameter is preferably 15 μm, from the viewpoint of mechanical strength. Additionally, the glass fibers normally have a circular cross-section, but reinforcement fibers having a cross-section of an arbitrary shape, such as glass fibers having an elliptic cross-section with an arbitrary aspect ratio, glass fibers having a flattened cross-section, and glass fibers having a cocoon-like cross-section, can also be used as the inorganic filler, which are characterized by the abilities to improve flowability during injection molding and to provide molded articles with less warpage. Additionally, the type of the glass fibers are not specifically limited as long as the glass fibers are those commonly used as a reinforcement material for plastics, but the type of the glass fibers is preferably E-glass or low-dielectric glass, the former of which has excellent mechanical properties and high heat resistance, and the latter of which has excellently low dielectric properties.

The glass fibers used in the present invention preferably has a relative permittivity of less than 7, even more preferably less than 5, when measured at a frequency of 1 GHz by a cavity resonator method. When the glass fibers has a relative permittivity within the above range, the values of relative permittivity and of dielectric loss tangent can be kept low in the resulting thermoplastic polyester resin composition.

The blending amount of the inorganic filler (F) used in the present invention is preferably in the range of 1 to 100 parts by weight with respect to 100 parts by weight of the non-liquid crystal thermoplastic polyester resin (A). When not less than 1 part by weight of the inorganic filler (F) is added, higher mechanical strength and higher heat resistance can be achieved, and dimensional stability can also be improved in molded articles. The blending amount of the inorganic filler is more preferably not less than 30 parts by weight, even more preferably not less than 40 parts by weight, particularly preferably not less than 50 parts by weight. On the other hand, when not less than 100 parts by weight of the inorganic filler (F) are added, higher moldability can be achieved. The blending amount of the inorganic filler is more preferably not more than 90 parts by weight, even more preferably not more than 80 parts by weight.

Moreover, when a combination of the above-described glass fibers with, for example, milled fibers, glass flakes, kaolin, talc, or mica is used as the inorganic filler (F) used in the present invention, the combination is effective in reduction of anisotropy, which helps provide molded articles with less warpage. Additionally, when 0.01 to 1 part by weight of calcium carbonate, zinc oxide, magnesium oxide, aluminum oxide, mixtures of magnesium oxide and aluminum oxide, powdered silicate mineral, aluminum silicate, or silicon oxide, with respect to 100 parts by weight of the non-liquid crystal thermoplastic polyester resin (A), is added, higher residence stability in molding can be achieved.

The average particle diameter of granular, powder, or lamellar inorganic fillers is preferably in the range of 0.1 to 20 μm from the viewpoint of impact strength. Particularly, the average particle diameter of such inorganic fillers is preferably not less than 0.2 μm in view of the dispersibility of the inorganic fillers in resins, and is preferably not more than 10 μm from the viewpoint of mechanical strength.

The thermoplastic polyester resin composition according to the present invention may comprise a thermoplastic resin(s) in addition to the components (A) and (B), as long as the purpose of the invention is not impaired, to improve, for example, moldability, dimensional accuracy, mold shrinkage, and toughness. Examples of the thermoplastic resin(s) other than the components (A) and (B) can include vinyl resins, polyamide resins, polyacetal resins, polyurethane resins, aromatic or aliphatic polyketone resins, polyetheretherketone resins, polyimide resins, thermoplastic starch resins, aromatic polycarbonate resins, polyarylate resins, polysulfone resins, polyethersulfone resins, phenoxy resins, polyetherimide resins, cellulose acetate resins, and polyvinyl alcohol resins. In cases where a thermoplastic resin(s) other than the components (A) and (B) is added, it is preferable that the blending ratio of the component (A) or (B) is the highest among those of the resins in the resulting thermoplastic polyester resin composition.

The thermoplastic polyester resin composition according to the present invention can comprise a flame retardant, as long as the effect of the invention is not impaired. Examples of the flame retardant include phosphorus-based flame retardants, halogen-based flame retardants such as bromine-based flame retardants, salts of triazine compounds with cyanuric or isocyanuric acid, silicone-based flame retardants, and inorganic flame retardants. These may be mixed in a combination of two or more.

The blending amount of the flame retardant is preferably in the range of 1 to 50 parts by weight with respect to 100 parts by weight of the non-liquid crystal thermoplastic polyester resin (A). More preferably, the blending amount of the flame retardant is not less than 5 parts by weight from the viewpoint of flame resistance, and is not more than 40 parts by weight from the viewpoint of heat resistance.

The thermoplastic polyester resin composition according to the present invention may comprise a release agent to improve mold release characteristics, which are properties related to release from molds during melt molding. Examples of the release agent include higher fatty acid ester-based waxes such as montanate and stearate waxes, polyolefin-based waxes, and ethylene bis-stearamide-based waxes.

The blending amount of the release agent is preferably in the range of 0.01 to 1 part by weight with respect to 100 parts by weight of the non-liquid crystal thermoplastic polyester resin (A). More preferably, the blending amount of the release agent is not less than 0.03 parts by weight from the viewpoint of mold release characteristics, and is not more than 0.6 parts by weight from the viewpoint of heat resistance.

The thermoplastic polyester resin composition according to the present invention can further comprise one or more selected from carbon black, titanium oxide and other various color pigments or dyes to change to various colors or to improve weather resistance (light resistance) and conductivity. Examples of carbon black include channel black, furnace black, acetylene black, anthracene black, lamp soot, turpentine soot, and graphite. In the case of carbon black, carbon black with an average particle diameter of not more than 500 nm and with a dibutyl phthalate absorption value of 50 to 400 $cm^3/100$ g is preferably used. In the case of titanium oxide, titanium oxide with a crystal structure such as rutile-type or anatase-type crystal structure and having an average particle diameter of not more than 5 μm is preferably used.

The above-described carbon black, titanium oxide, and other various color pigments or dyes may be treated with, for example, aluminum oxide, silicon oxide, zinc oxide, zirconium oxide, a polyol, and/or a silane coupling agent. These may also be combined with various thermoplastic resins to prepare a mixed material by melt blending or simple blending so that the resulting mixed material may be used to improve the dispersibility and/or the handling properties during molding in the resin composition according to the present invention.

The blending amount of the pigment or the dye is preferably in the range of 0.01 to 3 parts by weight with respect to 100 parts by weight of the non-liquid crystal thermoplastic polyester resin (A). More preferably, the blending amount of the pigment or the dye is not less than 0.03 parts by weight in view of preventing uneven coloring, and is not more than 1 part by weight from the viewpoint of mechanical strength.

The thermoplastic polyester resin composition according to the present invention may comprise one or more optional additives, such as an antioxidant, a heat stabilizer, an ultraviolet absorber, a light stabilizer, a crystal nucleating agent, a plasticizer, a flame retardant aid, and an antistatic agent, as long as the purpose of the invention is not impaired.

The thermoplastic polyester resin composition according to the present invention can be obtained, for example, by melt kneading the components (A) to (D) and other components as required.

Examples of the method for melt kneading include a method in which the non-liquid crystal thermoplastic polyester resin (A), the thermoplastic resin with excellently low dielectric properties (B), the compatibilizer (C), the compound (D) having a specified structure, and other various additives are premixed and the resulting mixture is provided to, for example, an extruder and then melt-kneaded well, a method in which predetermined amounts of the above components are provided using a quantitative feeder such as a loss-in-weight feeder to, for example, an extruder and then melt-kneaded well, or the like.

Examples of the above-described premixture include a method in which the above-described components are mixed by dry blending, and a method in which the above-described components are mixed using a mechanical mixing machine, such as a tumbler, a ribbon mixer, or a Henschel mixer. Additionally, in cases where the inorganic filler (F) is added, the inorganic filler (F) may be added to a multi-screw extruder, such as a twin-screw extruder, through a side-feeder located between a breech-loading part and a vent. Additionally, in cases where a liquid additive is added, a method in which the liquid additive is added using a plunger pump to a multi-screw extruder, such as a twin-screw extruder, through a liquid addition nozzle located between a breech-loading part and a vent, a method in which the liquid additive is provided using a metering pump to the multi-screw extruder through, for example, a breech-loading part, or the like may be used.

Preferably, the thermoplastic polyester resin composition according to the present invention is pelletized and then used for molding process. One of the pelletizing methods is a method in which each component of the thermoplastic polyester resin composition is extruded into strands by using, for example, a single-screw extruder, twin-screw extruder, triple-screw extruder, conical extruder, or kneader-type mixing machine equipped with, for example, a "Unimelt-type" or "Dulmage-type" screw and the resulting strands are cut by a strand cutter.

Films, fibers, and other molded articles with various shapes can be produced from the thermoplastic polyester resin composition according to the present invention by melt molding. Examples of melt molding techniques include injection molding, extrusion molding, and blow molding, and injection molding is particularly preferred for use.

In addition to the conventional injection molding technique, injection molding techniques, such as gas-assist molding, double molding, sandwich molding, in-mold molding, insert molding, and injection press molding techniques, are known as the technique of injection molding, and any of the molding techniques can be used.

Preferably, the thermoplastic polyester resin composition according to the present invention is combined with a metal by insert molding and the resulting articles are used.

The metal used in the present invention is not specifically limited, but aluminium, copper, iron, nickel, chromium, magnesium, molybdenum, gold, silver, zinc, tin, and alloys containing any of these metals as a major component are preferably used; among those, aluminium, copper, iron, nickel, chromium, magnesium, molybdenum, and alloys thereof are particularly preferred for use.

The shape of a metal material used in the present invention and the method of processing the metal material are not specifically limited, but any manufacturing process such as cutting, machining, bending, or drawing, that is any machining process such as sawing, milling, electric discharging machining, drilling, pressing, grinding, or polishing, can give the metal material a desired shape or structure. A metal component with any required shape or structure as an element can be obtained through any of those machining processes. The metal component is used as an insert for injection molding. Preferably, a thick film of, for example, oxide or hydroxide is not formed on the surface of the processed metal component with a required shape or structure, to which the thermoplastic polyester resin composition according to the present invention will be attached. Contaminants excluding rust products, that is machining oil, sebum stains, chips, and the like attached on the surface during metal working or sebum stains attached on the surface during carrying events, are preferably removed by degreasing.

The surface of a metal material used in the present invention is preferably roughened to increase metal bondability. The method for the roughening process is not specifically limited, but roughening processes by physical means, such as abrasive blasting and laser abrasion, and chemical roughening processes, such as chemical etching and anode oxidation, can be used, and one, or two or more of the roughening processes may be used.

Specifically, the surface treatment can also be performed on the metal component by, for example, any of the following surface treatment technologies called the TRI (registered trademark) System (TOADENKA Co., LTD.) by which an adhesive layer is formed on the surface of a metal component by using an adhesion promoter comprising a particular triazine compound and an organic compound capable of chemically reacting with the particular triazine compound, the NMT (registered trademark) (Taiseiplas Co., Ltd.) by which the surface of a metal component is finely roughened by a series of treatments where the surface of a metal component is degreased with an alkaline solution, neutralized with an acidic solution, soaked in a hydrazine-based unique solution, and is post-treated by, for example, washing in water and drying, and the AMALPHA (registered trademark) (MEC COMPANY LTD.) in which the surface of a metal component is etched in a unique etching solution.

Molded articles according to the present invention can be used in various applications, such as automobile components, electric/electronic components, building components, various types of containers, daily necessities, household goods, and sanitary goods. Additionally, the molded articles of the present invention, which have excellently low dielectric properties, are useful for electric/electronic and/or automobile components compatible with high-frequency operation, including, particularly, those for wireless LAN, ETC, antennas for satellite communication systems, automotive radars, and the like. In addition, these are also useful for composite molded articles, which are produced by insert molding with metal components and then used.

Specific examples of the applications can include automotive underhood components, such as air flow meters, air pumps, ignition bobbins, ignition coil housings, clutch bobbins, sensor housings, idle speed control valves, vacuum switching valves, housings for ECUs, inhibitor switches, rotation sensors, acceleration sensors, distributor caps, coil bases, housings for ABS brake actuators, air cleaner housings, brake booster components, various types of housings, various types of tubes, various types of tanks, various types of hoses, various types of clips, various types of valves, and various types of pipes; automotive interior components, such as torque control levers, air outlet blades, washer switch levers, window regulator handles, window regulator handle knobs, signal light levers, sun visor brackets, and housings for various motors; automotive exterior components, such as roof racks, fenders, garnishes, bumpers, door mirror mount covers, grille and apron covering frames, lamp reflectors, lamp bezels, and door handles; various connectors for automobiles, such as wire harness connectors, SMJ connectors, and PCB connectors; and electric/electronic components represented by electrical connectors, relay cases, coil bobbins, optical pickup chassis, motor cases, housings and internal components of notebook personal computers, housings and internal components of CRT displays, housings and internal components of printers, housings and internal components of mobile terminals such as cell phones, mobile personal computers, and hand-held mobile devices, housings and internal components of storage media (such as CD, DVD, PD, or FD) drives, housings and internal components of copy machines, housings and internal components of facsimile machines, and the like. Furthermore, examples of the applications can include components of VTRs (video tape recorders), components of televisions, irons, hair dryers, components of rice cookers, components of microwave ovens, components of audio equipment; components of video equipment, such as those of video cameras and projectors; base materials for optical storage media, such as LaserDisc (registered trademark), compact disc (CD), DVD-ROM, DVD-R, and blue-ray disc; and components of home/office electrical appliances represented by those of lighting equipment, refrigerators, air conditioners, and the like. Additionally, the molded articles of the present invention are useful as housings and internal components of electronic musical instruments, home video game consoles, hand-held game consoles, and the like; electric/electronic components, such as various types of gears, various types of housings, sensors, connectors, sockets, resistors, relay cases, switches, coil bobbins, condensers, optical pickups, oscillators, various types of terminal boards, printed circuit boards, speakers, headphones, micro motors, magnetic head bases, power modules, semiconductors, liquid crystals, FDD chassis, motor brush holders, and transformer components; building components, such as sliding window rollers, components of window shades, pipe joint fittings, curtain liners, components of window blinds, components of gas meters, components of water meters, components of water heaters, roof panels, and hanging tools for ceiling panels; machine components, such as bearings, levers, cams, ratchets, rollers, components of water supply systems, components of toys, fans, cleaning jigs, components of motors, microscopes, binoculars, cameras, and clocks; and the like.

The resin composition according to the present invention has high metal bonding strength as well as high mechanical strength, and is thus particularly useful, among the above, for applications in automobile components, such as ignition bobbins, ignition coil housings, clutch bobbins, sensor housings, idle speed control valves, vacuum switching valves, housings for ECUs, vacuum pump cases, and inhibitor switches, and for electrical connectors, relay cases, coil bobbins, optical pickup chassis, motor cases, housings and internal components of notebook personal computers, and housings and internal components of mobile terminals such as cell phones, mobile personal computers, and hand-held mobile devices. Furthermore, the resin composition according to the present invention, which has excellently low dielectric properties, is integrated with a metal component(s) by insert molding to form a metal composite molded article. Such metal composite molded articles can be suitably used for components of mobile telecommunication devices.

EXAMPLES

Next, the effects of the thermoplastic polyester resin composition according to the present invention will be specifically described by examples. Raw materials used in Examples and Comparative Examples are shown below. Unless otherwise stated, the term "percent (%)" refers to percent (%) by weight and the term "parts" refers to parts by weight, and the slash sign (/) in each of the following resin names indicates copolymerization.

Non-Liquid Crystal Thermoplastic Polyester Resin (A)
<A-1> Polybutylene terephthalate resin: A polybutylene terephthalate resin, manufactured by Toray Industries, Inc., having a carboxyl group content of 30 eq/t, an intrinsic viscosity of 0.85, a specific gravity of 1.31, and a cold crystallization temperature ($T_{C4'}$) of 175° C. was used.
<A-2> Polybutylene (terephthalate/isophthalate) resin (weight ratio: terephthalic acid/isophthalic acid=90/10): A polybutylene terephthalate resin, manufactured by Toray Industries, Inc., having an intrinsic viscosity of 0.85, a specific gravity of 1.31, and a cold crystallization temperature ($T_{C4'}$) of 145° C. was used.
<A-3> Polyethylene terephthalate resin: A polyethylene terephthalate resin, manufactured by Toray Industries, Inc., having a carboxyl group content of 40 eq/t, an intrinsic viscosity of 0.65, a specific gravity of 1.38, and a cold crystallization temperature ($T_{C4'}$) of 173° C. was used.

(B) Thermoplastic Resin with Excellently Low Dielectric Properties
<B-1-1> Linear low-density polyethylene resin (corresponding to the component (B-1) of the present invention): A straight-chain low-density polyethylene resin manufactured by Prime Polymer Co., Ltd., "ULTZEX" (registered trademark) 4570, having a dielectric loss tangent of 0.0004, a specific gravity of 0.945, and a cold crystallization temperature ($T_{CB'}$) of 106° C. was used.
<B-1-2> High-density polyethylene resin (corresponding to the component (B-1) of the present invention): A high-density polyethylene resin manufactured by Prime Polymer Co., Ltd., "HI-ZEX" (registered trademark) 2100J, having a dielectric loss tangent of 0.0004, a specific gravity of 0.953, and a cold crystallization temperature ($T_{CB'}$) of 106° C. was used.
<B-1-3> Polypropylene resin (corresponding to the component (B-1) of the present invention): A polypropylene resin manufactured by Prime Polymer Co., Ltd., "Prime Polypro" (registered trademark) J704UG, having a dielectric loss tangent of 0.0005, a specific gravity of 0.91, and a cold crystallization temperature ($T_{CB'}$) of 118° C. was used.
<B-2-1> Liquid crystal polyester resin (corresponding to the component (B-2) of the present invention): A liquid crystal polyester resin produced as described below was used.

In a 5-L reactor equipped with a stirring impeller and a distillation column, 994 parts by weight of p-hydroxybenzoic acid, 126 parts by weight of 4,4'-dihydroxybiphenyl, 112 parts by weight of terephthalic acid, 216 parts by weight of polyethylene terephthalate with an intrinsic viscosity of about 0.6 dl/g, and 960 parts by weight of acetic anhydride (corresponding to 1.10 equivalents with respect to total phenolic hydroxy groups) were placed, and the resulting mixture was allowed to react with stirring under nitrogen gas atmosphere at 145° C. for 1 hour, and was then heated over 4 hours to increase the temperature from 145° C. to 320° C. Subsequently, the mixture was kept at a polymerization temperature of 320° C. to continue the polymerization reaction further, while the pressure was decreased to 1.0 mmHg (133 Pa) over 1.0 hour, and the polymerization was not completed until the amount of torque required for stirring came to 20 kg·cm. Then, a polymer in the reactor was extruded into strands through a die, which had a circular orifice with a diameter of 10 mm, and the resulting strands were pelletized with a cutter to yield the liquid crystal polyester resin <B-2-1>. When the composition of the liquid crystal polyester resin <B-2-1> was analyzed, it was found that the ratios of the structural unit derived from p-hydroxybenzoic acid, the structural unit derived from 4,4'-dihydroxybiphenyl, the ethylenedioxy unit derived from polyethylene terephthalate, and the structural unit derived from terephthalic acid were 66.7% by mole, 6.3% by mole, 10.4% by mole, and 16.7% by mole, respectively. Additionally, the melting point and the dielectric loss tangent were 313° C. and 0.0014, respectively.

<B-2-2> Polyphenylene sulfide resin (corresponding to the component (B-2) of the present invention): A polyphenylene sulfide resin manufactured by Toray Industries, Inc., "TORELINA" (registered trademark), having a dielectric loss tangent of 0.0034 was used.

<B-2-3> Polystyrene resin (corresponding to the component (B-2) of the present invention): A polystyrene resin manufactured by PS Japan Corporation, GPPS HF77, having a dielectric loss tangent of 0.0004 was used.

<B-2-4> Polyphenylene ether resin (corresponding to the component (B-2) of the present invention): A polyphenylene ether resin manufactured by Asahi Kasei Corporation, "ZYLON" (registered trademark) 1000H, having a dielectric loss tangent of 0.0003 was used.

(C) Glycidyl-Containing Ethylene Copolymer

<C-1> Ethylene-glycidyl methacrylate copolymer: An ethylene-glycidyl methacrylate copolymer manufactured by Sumitomo Chemical Company, Limited, "BONDFAST" (registered trademark) BF-2C, having a glycidyl methacrylate content of 6% and a specific gravity of 0.93 was used.

<C-2> Acid anhydride-modified ethylene copolymer: A maleic anhydride-modified ethylene/1-butene copolymer manufactured by Mitsui Chemicals, Inc., "TAFMER" (registered trademark) MH7020, having a modification ratio of 2% by weight was used.

<C-3> Oxazoline-functional polystyrene resin: An oxazoline-functional polystyrene resin manufactured by NIPPON SHOKUBAI CO., LTD., "EPOCROS" (registered trademark) RPS-1005, having an oxazoline group content of 0.27 mmol/g was used.

<C-4> Isocyanate-based organic silane compound: 3-Isocyanate propyltriethoxysilane manufactured by Shin-Etsu Chemical Co., Ltd., KBE-9007, having an isocyanate group equivalent weight of 247 g/mol was used.

<C-5> Polycarbodiimide compound: A polycarbodiimide compound manufactured by Nisshinbo Chemical Inc., "CARBODILITE" (registered trademark) HMV-8CA, having a carbodiimide group equivalent weight of 278 g/mol was used.

(D) Compound with a Specific Structure

<D-1> Organic phosphonium salt (tetraphenyl phosphonium bromide): Tetraphenyl phosphonium bromide (reagent grade), manufactured by Tokyo Chemical Industry Co., Ltd., was used.

<D-2> Tertiary amine (benzyl dimethylamine): N,N-dimethylbenzylamine (reagent grade), manufactured by Tokyo Chemical Industry Co., Ltd., was used.

<D-3> Amidine compound: 1,8-Diazabicyclo(5,4,0)undecene-7 manufactured by San-Apro Ltd., "DBU" (registered trademark), was used.

<D-4> Imidazole: 2-Ethyl-4-methylimidazole (2E4MZ), manufactured by Shikoku Chemicals Corporation, was used.

<D-5> Boron compound (boron trifluoride monoethylamine): Boron trifluoride ethylamine (reagent grade), manufactured by Tokyo Chemical Industry Co., Ltd., was used.

Metal Salt of an Organic Phosphate Ester (E)

<E-1> Phosphate ester sodium salt: An organic phosphate ester sodium salt manufactured by ADEKA Corp., "ADK STAB" (registered trademark) NA-11 (sodium 2,2'-methylene-bis(4,6-di-t-butylphenyl)phosphate), was used.

Inorganic Filler (F)

<F-1> Glass fiber: Glass fibers manufactured by Nippon Electric Glass Co., Ltd., ECS03T-187, having a cross-sectional diameter of 13 μm, a fiber length of 3 mm, and a permittivity (at 1 GHz) of about 6.6 and treated with an epoxy sizing agent were used.

<F-2> Glass fiber: Glass fibers manufactured by CPIC, ECS303N-3KNHL, having a cross-sectional diameter of 13 μm, a fiber length of 3 mm, and a permittivity (at 1 GHz) of about 4.5 and treated with an epoxy sizing agent were used.

[Measurement Methods for Various Properties]

The properties of Examples and Comparative Examples were evaluated by the following measurement methods.

1. Dielectric Properties

Plate-like test pieces having a size of 80 mm×80 mm and a thickness of 1 mm (the film gate) were obtained by using a NEX-1000 injection molding machine, manufactured by NISSEI PLASTIC INDUSTRIAL CO., LTD., for molding under temperature conditions of 250° C. as the cylinder temperature and 80° C. as the mold temperature and under cycle conditions of 15 seconds as the sum of filling and packing times and 10 seconds as the cooling time. Moreover, in cases where the polyethylene terephthalate resin was used as the component (A), the condition of cylinder temperature was changed to 270° C. Each of the obtained plate-like molded articles was cut in the middle into 1 mm width along the resin flow direction to prepare a molded article of a cubic shape, and the resulting molded article was analyzed by the cavity resonance perturbation method using a network analyzer E5071C, manufactured by Agilent Technologies Japan, Ltd., and a cavity resonator CP521, manufactured by KANTO Electronic Application and Development Inc., to determine relative permittivity and dielectric loss tangent at a frequency of 5.8 GHz. Smaller values of relative permittivity and dielectric loss tangent were each considered as indicating excellently low dielectric properties.

2. Mechanical Properties (Flexural Strength and Flexural Modulus)

Test pieces for evaluation of flexural properties, having a test piece length of 127 mm, a width of 12.7 mm, and a thickness of 3.2 mm, were obtained by using a NEX-1000 injection molding machine, manufactured by NISSEI PLASTIC INDUSTRIAL CO., LTD., for molding under temperature conditions of 250° C. as the cylinder temperature and 80° C. as the mold temperature and under cycle conditions of 10 seconds as the sum of filling and packing times and 10 seconds as the cooling time. Moreover, in cases where the polyethylene terephthalate resin was used as the component (A), the condition of cylinder temperature was changed to 270° C. Each of the obtained test pieces for evaluation of flexural properties was used to measure flexural strength and flexural modulus according to ASTM D790. The average of three measurements was considered as the measured value. A material showing larger values of flexural strength and flexural modulus was considered as a material with more excellent mechanical properties.

3. Heat Resistance (Heat Distortion Temperature)

Test pieces for evaluation of heat distortion temperature, having a test piece length of 127 mm, a width of 12.7 mm, and a thickness of 3.2 mm, were obtained by using a NEX-1000 injection molding machine, manufactured by NISSEI PLASTIC INDUSTRIAL CO., LTD., for injection molding under the same conditions as those for the evaluation of mechanical properties described in the above paragraph 2. Each of the obtained test pieces for evaluation of heat distortion temperature was used to measure heat distortion temperature under a load of 1.82 MPa according to ASTM D648 (2005). The average of three measurements was considered as the measured value. A material with a higher heat distortion temperature was considered as a material with higher heat resistance.

4. Metal Bondability(Metal Bonding Strength)

Test pieces for evaluation of metal bondability had a shape based on the description in ISO 19095-2: 2015, "Overlapped test specimens (type B)," and were produced from thermoplastic polyester resin compositions with component compositions of Examples and Comparative Examples and from a metal component by using a NEX-1000 injection molding machine, manufactured by NISSEI PLASTIC INDUSTRIAL CO., LTD., for insert molding. Injection was performed under the following conditions: cylinder temperature, 270° C.; mold temperature, 140° C.; injection rate, adjusted to complete the injection at 0.5 seconds of filling time; packing pressure, 40 MPa; injection time, seconds; cooling time, 15 seconds. As the metal component, a piece of aluminium (A5052) surface-treated by TRI System (TOADENKA Co., LTD.) was used.

Each of the produced test pieces was used to measure shear bond strength of resin-metal joints according to ISO 19095-3: 2015, and materials with a shear bond strength of not less than 20 MPa, a shear bond strength of not less than 15 MPa and less than 20 MPa, and a shear bond strength of less than 15 MPa were graded into "A," "B," and "C," respectively, and materials with a shear bond strength of not less than 15 MPa were regarded as acceptable.

5. Cold Crystallization Temperature Properties ($\Delta T_{CAB}$, $\Delta T_{CA'B'}$, and $\Delta T_{CBB'}$) of Polyolefin Resins (B-1)

An amount of 10 mg of each thermoplastic polyester resin composition was heated on a differential scanning calorimeter DSC-7 (manufactured by PerkinElmer, Inc.) from room temperature to a temperature of the melting point of the non-liquid crystal thermoplastic polyester resin (A)+20° C. at a temperature rising rate of 20° C./min, kept at the same temperature for 5 minutes, and then cooled to room temperature at a temperature dropping rate of 20° C./min, to observe the exothermic peak temperature derived from the non-liquid crystal thermoplastic polyester resin (A) and the exothermic peak temperature derived from the polyolefin resin (B-1), and the observed exothermic peak temperatures were determined as the cold crystallization temperature derived from the component (A), $T_{CA}$, in the thermoplastic polyester resin composition and as the cold crystallization temperature derived from the component (B-1), $T_{CB}$, in the same resin composition. Additionally, each of the raw materials, which were the non-liquid crystal thermoplastic polyester resin (A) and the polyolefin resin (B-1), was used alone for the same measurement under the same conditions to determine the cold crystallization temperature of the simple component (A) alone, $T_{CA'}$, and the cold crystallization temperature of the simple component (B) alone, $T_{CB'}$, except that the highest temperature reached after heating was changed to a temperature of the melting point of the non-liquid crystal thermoplastic polyester resin (A) or the polyolefin resin (B-1)+20° C. The difference between $T_{CA}$ and $T_{CB}$ was calculated as an absolute value, and the absolute value was considered as the difference between the cold crystallization temperature of the thermoplastic polyester resin and that of the polyolefin resin ($\Delta T_{CAB}$) (i.e., $|T_{CA}-T_{CB}|=\Delta T_{CAB}$). Additionally, the difference between $T_{CA'}$ and $T_{CB'}$ was calculated as an absolute value, and the absolute value was considered as the difference between the cold crystallization temperature of the simple thermoplastic polyester resin alone and that of the simple polyolefin resin alone ($\Delta T_{CA'B'}$) (i.e. $|T_{CA'}-T_{CB'}|=\Delta T_{CA'B'}$). Furthermore, the difference between $T_{CB'}$ and $T_{CB}$ was calculated, and the obtained value was considered as the variation in cold crystallization temperature of the polyolefin resin ($\Delta T_{CBB'}$) (i.e., $T_{CB'}-T_{CB}=\Delta T_{CBB'}$).

6. Concentration of Epoxy Groups in Thermoplastic Polyester Resin Compositions

An amount of 2 g of each thermoplastic polyester resin composition was dissolved in 30 mL of a mixed solution of o-cresol/chloroform (2/1, vol/vol). To the resulting solution, 20 mL of acetic acid and 10 mL of a 20% by weight solution of triethylammonium bromide in acetic acid were added, and a potentiometric titration with a 0.1 mol/L solution of perchloric acid in acetic acid was then performed on the resulting mixture to calculate the concentration of epoxy groups.

7. Dispersion Diameter of Thermoplastic Resins with Excellently Low Dielectric Properties (B)

Test pieces for evaluation of flexural properties were obtained under the same conditions as for the evaluation of mechanical properties described in the above paragraph 2. Each of the obtained test pieces for evaluation of flexural properties was cut in the middle along the direction perpendicular to the resin flow direction, and the resulting cross-section was observed using a scanning electron microscope at a magnification of around 1,000 to 20,000 times. The average values of the maximum and minimum diameters of 50 arbitrary dispersed phases composed of a thermoplastic resin with excellently low dielectric properties (B) in a matrix phase composed of a non-liquid crystal thermoplastic polyester resin (A) were determined, and the mean of the average values was defined as the dispersion diameter of the component (B) in each thermoplastic polyester resin composition. In cases where two or more thermoplastic resins were used as the component (B), the different types of the island phase resins were identified as appropriate by differential staining or elemental mapping analysis to determine the dispersion diameter of each resin species. If a matrix phase or a quasi-bicontinuous structure was formed by a phase composed of a thermoplastic resin (B), the thermoplastic resin (B) was evaluated as "N".

[Examples 1 to 29] and [Comparative Examples 1 to 13]

A co-rotating twin-screw extruder (TEX-30a; manufactured by Japan Steel Works, Ltd.) equipped with two screws each having a diameter of 30 mm and a L/D ratio of 35 and with a vent was used to mix (A) a non-liquid crystal thermoplastic polyester resin, (B) a thermoplastic resin with excellently low dielectric properties, (C) a compatibilizer, (D) a compound, and (E) a metal salt of an organic phosphate ester according to each of the compositions listed in Tables 1 to 5, which were inputted from a breech-loading part of the twin-screw extruder. Either of the inorganic fillers (F) was added by a side-feeder located between the breech-loading part and the vent. Furthermore, those components were melt-kneaded and extruded into strands under extrusion conditions including 260° C. of kneading temperature and 150 rpm of screw rotation speed, and the resulting strands were passed through a cooling bath and then pelletized by a strand cutter.

Each of the obtained pellets was dried on a hot-air dryer at a temperature of 110° C. for 6 hours, and then evaluated by the above methods. The results are presented in Tables 1 to 5.

TABLE 1

| | | | | Examples | | | | | | |
|---|---|---|---|---|---|---|---|---|---|---|
| | | Code | Unit | 1 | 2 | 3 | 4 | 5 | 6 | 7 |
| Non-liquid crystal thermoplastic polyester resin (A) | Polybutylene terephthalate resin | A-1 | parts by weight | 100 | 85 | 75 | | 100 | 100 | 100 |
| | Polybutylene (terephthalate/isophthalate) resin | A-2 | parts by weight | | | | 100 | | | |
| | Polyethylene terephthalate resin | A-3 | parts by weight | | 15 | 25 | | | | |
| Thermoplastic resin (B) | Linear low-density polyethylene resin | B-1-1 | parts by weight | 50.4 | 50.4 | 50.4 | 50.4 | 47.2 | 66.0 | 50.4 |
| | High-density polyethylene resin | B-1-2 | parts by weight | | | | | | | |
| | Polypropylene resin | B-1-3 | parts by weight | | | | | | | |
| Compatibilizer (C) | Glycidyl-containing ethylene copolymer | C-1 | parts by weight | 4.1 | 4.1 | 4.1 | 4.1 | 3.8 | 4.2 | 6.2 |
| Compound (D) | Organic phosphonium salt | D-1 | parts by weight | 0.5 | 0.5 | 0.5 | 0.5 | 0.5 | 0.5 | 0.5 |
| Inorganic filler (F) | Glass fiber | F-1 | parts by weight | 39.0 | 39.0 | 39.0 | 39.0 | 39.0 | 39.0 | 39.0 |
| | (B) + (C) | | parts by weight | 54.5 | 54.5 | 54.5 | 54.5 | 51.0 | 70.2 | 56.6 |
| | (B)/(C) | | — | 12.3 | 12.3 | 12.3 | 12.3 | 12.4 | 15.7 | 8.1 |
| [(B-1) + (C-1)]/[(A) + (B-1) + (C-1)] × 100 | | | % by volume | 43 | 43 | 43 | 43 | 41 | 49 | 44 |
| Dielectric properties | Relative permittivity | | — | 2.96 | 2.98 | 2.99 | 2.98 | 2.98 | 2.89 | 2.96 |
| | Dielectric loss tangent | | — | 0.0062 | 0.0062 | 0.0062 | 0.0053 | 0.0063 | 0.0058 | 0.0064 |
| Mechanical properties | Flexural strength | | MPa | 134 | 136 | 137 | 128 | 136 | 121 | 127 |
| | Flexural modulus | | GPa | 4.5 | 4.5 | 4.4 | 4.3 | 4.6 | 3.8 | 3.8 |
| Heat resistance | Heat distortion temperature | | ° C. | 184 | 191 | 189 | 166 | 188 | 179 | 181 |
| Metal bondability | Metal bonding strength | | — | B | A | A | A | A | B | B |
| Dispersion diameter of the component (B) | Dispersion diameter of the components <B-1-1> to <B-1-3> | | μm | 1.1 | 1.2 | 1.1 | 1.2 | 1.0 | 1.4 | 1.1 |
| | Dispersion diameter of the components <B-2-1> to <B-2-4> | | " | — | — | — | — | — | — | — |
| | $\Delta T_{CA'B'}$ | | ° C. | 69.2 | 66.7 | 66.7 | 39.1 | 69.2 | 69.2 | 69.2 |
| | $\Delta T_{CAB}$ | | " | 87.0 | 72.8 | 72.0 | 66.3 | 92.7 | 84.7 | 92.4 |
| | $\Delta T_{CBB'}$ | | " | 11.7 | 11.3 | 12.7 | 12.5 | 14.2 | 10.4 | 15.1 |
| Concentration of epoxy groups in a thermoplastic polyester resin composition | | | eq/t | 22.1 | 22.6 | 22.5 | 21.1 | 21.9 | 22.7 | 28.8 |

| | | | | Examples | | | |
|---|---|---|---|---|---|---|---|
| | | Code | Unit | 8 | 9 | 10 | 11 |
| Non-liquid crystal thermoplastic polyester resin (A) | Polybutylene terephthalate resin | A-1 | parts by weight | 100 | 100 | 100 | 100 |
| | Polybutylene (terephthalate/isophthalate) resin | A-2 | parts by weight | | | | |
| | Polyethylene terephthalate resin | A-3 | parts by weight | | | | |

TABLE 1-continued

| | | | | | | | |
|---|---|---|---|---|---|---|---|
| Thermo-plastic resin (B) | Linear low-density polyethylene resin | B-1-1 | parts by weight | 50.4 | 50.4 | | |
| | High-density polyethylene resin | B-1-2 | parts by weight | | | 50.4 | |
| | Polypropylene resin | B-1-3 | parts by weight | | | | 50.4 |
| Compati-bilizer (C) | Glycidyl-containing ethylene copolymer | C-1 | parts by weight | 2.2 | 1.2 | 4.1 | 4.1 |
| Compound (D) | Organic phosphonium salt | D-1 | parts by weight | 0.5 | 0.5 | 0.5 | 0.5 |
| Inorganic filler (F) | Glass fiber | F-1 | parts by weight | 39.0 | 39.0 | 39.0 | 39.0 |
| | (B) + (C) | | parts by weight | 52.6 | 51.6 | 54.5 | 54.5 |
| | (B)/(C) | | — | 22.9 | 42.0 | 12.3 | 12.3 |
| [(B-1) + (C-1)]/[(A) + (B-1) + (C-1)] × 100 | | | % by volume | 42 | 42 | 43 | 44 |
| Dielectric properties | Relative permittivity | | — | 2.97 | 2.98 | 2.96 | 2.95 |
| | Dielectric loss tangent | | — | 0.0063 | 0.0063 | 0.0062 | 0.0058 |
| Mechanical properties | Flexural strength | | MPa | 130 | 124 | 135 | 126 |
| | Flexural modulus | | GPa | 4.3 | 3.9 | 4.5 | 4.4 |
| Heat resistance | Heat distortion temperature | | °C. | 183 | 178 | 184 | 188 |
| Metal bondability | Metal bonding strength | | — | B | B | B | B |
| Dispersion diameter of the component (B) | Dispersion diameter of the components <B-1-1> to <B-1-3> | | μm | 1.5 | 2.2 | 1.3 | 3.8 |
| | Dispersion diameter of the components <B-2-1> to <B-2-4> | | " | — | — | — | — |
| | $\Delta T_{CA'B'}$ | | °C. | 69.2 | 69.2 | 68.9 | 56.8 |
| | $\Delta T_{CAB}$ | | " | 85.9 | 83.4 | 84.9 | 74.0 |
| | $\Delta T_{CBB'}$ | | " | 10.7 | 7.7 | 9.9 | 9.6 |
| Concentration of epoxy groups in a thermoplastic polyester resin composition | | | eq/t | 20.4 | 16.7 | 20.4 | 22.5 |

TABLE 2

| | | | | Examples | | | | | |
|---|---|---|---|---|---|---|---|---|---|
| | | Code | Unit | 12 | 13 | 14 | 15 | 16 | 17 |
| Non-liquid crystal thermoplastic polyester resin (A) | Polybutylene terephthalate resin | A-1 | parts by weight | 100 | 100 | 100 | 100 | 100 | 100 |
| Thermoplastic resin (B) | Linear low-density polyethylene resin | B-1-1 | parts by weight | 32.0 | 38.0 | | 32.0 | 32.0 | 32.0 |
| | Liquid crystal polyester resin | B-2-1 | parts by weight | 38.0 | 91.0 | 51.0 | | | |
| | Polyphenylene sulfide resin | B-2-2 | | | | | 38.0 | | |
| | Polystyrene resin | B-2-3 | | | | | | 38.0 | |
| | Polyphenylene ether resin | B-2-4 | parts by weight | | | | | | 38.0 |
| Compatibilizer (C) | Glycidyl-containing ethylene copolymer | C-1 | parts by weight | 4.5 | 5.8 | 5.0 | 4.5 | 4.5 | 4.5 |
| | Acid anhydride-modified ethylene copolymer | C-2 | | | | | | | |

TABLE 2-continued

|  |  | Code | Unit |  |  |  |  |  |  |
|---|---|---|---|---|---|---|---|---|---|
|  | Oxazoline-functional polystyrene resin | C-3 |  |  |  |  |  |  |  |
|  | Isocyanate-based organic silane compound | C-4 |  |  |  |  |  |  |  |
|  | Polycarbodiimide compound | C-5 |  |  |  |  |  |  |  |
| Compound (D) | Organic phosphonium salt | D-1 | parts by weight | 0.5 | 0.5 | 0.5 | 0.5 | 0.5 | 0.5 |
| Inorganic filler (F) | Glass fiber | F-1 | parts by weight | 45.0 | 59.0 | 39.2 | 45.0 | 45.0 | 45.0 |
|  | (B) + (C) |  | parts by weight | 74.5 | 134.8 | 56.0 | 74.5 | 74.5 | 74.5 |
|  | (B)/(C) | — |  | 15.6 | 22.2 | 10.2 | 15.6 | 15.6 | 15.6 |
| [(B-1) + (C-1)]/[(A) + (B-1) + (C-1)] × 100 |  | % by volume | 34 | 38 | 7 | 34 | 34 | 34 |
| Dielectric properties | Relative permittivity | — |  | 3.14 | 3.21 | 3.33 | 3.16 | 2.94 | 3.02 |
|  | Dielectric loss tangent | — |  | 0.0062 | 0.0056 | 0.0065 | 0.0066 | 0.0055 | 0.0061 |
| Mechanical properties | Flexural strength | MPa |  | 138 | 124 | 151 | 136 | 130 | 125 |
|  | Flexural modulus | GPa |  | 5.0 | 5.5 | 6.8 | 5.0 | 5.1 | 4.5 |
| Heat resistance | Heat distortion temperature | °C |  | 195 | 197 | 206 | 198 | 181 | 188 |
| Metal bondability | Metal bonding strength | — |  | B | B | A | B | B | B |
| Dispersion diameter of the component (B) | Dispersion diameter of the components <B-1-1> to <B-1-3> | μm |  | 1.2 | 3.1 | — | 1.3 | 1.1 | 1.3 |
|  | Dispersion diameter of the components <B-2-1> to <B-2-4> | " |  | 3.7 | 4.9 | 4.2 | 2.4 | 3.3 | 4.6 |
| $\Delta T_{CA'B'}$ |  | °C |  | 69.2 | 69.2 | — | 69.2 | 69.2 | 69.2 |
| $\Delta T_{CAB}$ |  | " |  | 86.4 | 87.9 | — | 89.1 | 91.8 | 87.6 |
| $\Delta T_{CBB'}$ |  | " |  | 16.6 | 15.9 | — | 14.4 | 16.6 | 11.9 |
| Concentration of epoxy groups in a thermoplastic polyester resin composition |  | eq/t |  | 25.3 | 27.9 | 26.6 | 22.8 | 24.9 | 27.8 |

|  |  |  |  |  | Examples |  |  |  |
|---|---|---|---|---|---|---|---|---|
|  |  |  | Code | Unit | 18 | 19 | 20 | 21 |
| Non-liquid crystal thermoplastic polyester resin (A) | Polybutylene terephthalate resin |  | A-1 | parts by weight | 100 | 100 | 100 | 100 |
| Thermoplastic resin (B) | Linear low-density polyethylene resin |  | B-1-1 | parts by weight | 50.4 | 50.4 | 50.4 | 50.4 |
|  | Liquid crystal polyester resin |  | B-2-1 | parts by weight |  |  |  |  |
|  | Polyphenylene sulfide resin |  | B-2-2 |  |  |  |  |  |
|  | Polystyrene resin |  | B-2-3 |  |  |  |  |  |
|  | Polyphenylene ether resin |  | B-2-4 | parts by weight |  |  |  |  |
| Compatibilizer (C) | Glycidyl-containing ethylene copolymer |  | C-1 | parts by weight |  |  |  |  |
|  | Acid anhydride-modified ethylene copolymer |  | C-2 |  |  | 4.1 |  |  |
|  | Oxazoline-functional polystyrene resin |  | C-3 |  |  |  | 4.1 |  |
|  | Isocyanate-based organic silane compound |  | C-4 |  |  |  |  | 4.1 |

TABLE 2-continued

|  |  | Code | Unit |  |  |  |  |
|---|---|---|---|---|---|---|---|
|  | Polycarbodiimide compound | C-5 |  |  |  |  | 4.1 |
| Compound (D) | Organic phosphonium salt | D-1 | parts by weight | 0.5 | 0.5 | 0.5 | 0.5 |
| Inorganic filler (F) | Glass fiber | F-1 | parts by weight | 39.0 | 39.0 | 39.0 | 39.0 |
| (B) + (C) |  |  | parts by weight | 54.5 | 54.5 | 54.5 | 54.5 |
| (B)/(C) |  |  | — | 12.3 | 12.3 | 12.3 | 12.3 |
| [(B-1) + (C-1)]/[(A) + (B-1) + (C-1)] × 100 |  |  | % by volume | 41 | 41 | 41 | 41 |
| Dielectric properties | Relative permittivity |  | — | 2.97 | 2.97 | 3.00 | 2.99 |
|  | Dielectric loss tangent |  | — | 0.0063 | 0.0064 | 0.0062 | 0.0063 |
| Mechanical properties | Flexural strength |  | MPa | 128 | 128 | 124 | 125 |
|  | Flexural modulus |  | GPa | 3.9 | 4.0 | 3.6 | 3.8 |
| Heat resistance | Heat distortion temperature |  | °C. | 181 | 179 | 178 | 178 |
| Metal bondability | Metal bonding strength |  | — | B | B | B | B |
| Dispersion diameter of the component (B) | Dispersion diameter of the components <B-1-1> to <B-1-3> |  | μm | 3.1 | 3.3 | 3.0 | 3.3 |
|  | Dispersion diameter of the components <B-2-1> to <B-2-4> |  | " | — | — | — | — |
| $\Delta T_{CA'B'}$ |  |  | °C. | 69.2 | 69.2 | 69.2 | 69.2 |
| $\Delta T_{CAB}$ |  |  | " | 83.6 | 86.2 | 84.4 | 82.3 |
| $\Delta T_{CBB'}$ |  |  | " | 8.9 | 8.3 | 7.6 | 6.5 |
| Concentration of epoxy groups in a thermoplastic polyester resin composition |  |  | eq/t | 0.0 | 0.0 | 0.0 | 0.0 |

TABLE 3

|  |  |  |  | Examples |  |  |  |  |  |  |  |
|---|---|---|---|---|---|---|---|---|---|---|---|
|  |  | Code | Unit | 22 | 23 | 24 | 25 | 26 | 27 | 28 | 29 |
| Non-liquid crystal thermoplastic polyester resin (A) | Polybutylene terephthalate resin | A-1 | parts by weight | 100 | 100 | 100 | 100 | 100 | 100 | 100 | 100 |
| Thermoplastic resin (B) | Linear low-density polyethylene resin | B-1-1 | parts by weight | 50.4 | 50.4 | 50.4 | 50.4 | 50.4 | 50.4 | 49.6 | 50.4 |
| Compatibilizer (C) | Glycidyl-containing ethylene copolymer | C-1 | parts by weight | 4.1 | 4.1 | 4.1 | 4.1 | 4.1 | 4.1 | 4.0 | 4.1 |
| Compound (D) | Organic phosphonium salt | D-1 | parts by weight |  |  |  |  | 0.5 | 0.5 | 0.5 | 0.5 |
|  | Tertiary amine | D-2 | parts by weight | 0.5 |  |  |  |  |  |  |  |
|  | Amidine compound | D-3 | parts by weight |  | 0.5 |  |  |  |  |  |  |
|  | Imidazole | D-4 | parts by weight |  |  | 0.5 |  |  |  |  |  |
|  | Boron compound | D-5 | parts by weight |  |  |  | 0.5 |  |  |  |  |
| Organic phosphate ester, metal salt (E) | Phosphate ester sodium salt | E-1 | parts by weight |  |  |  |  |  |  |  | 0.3 |
| Inorganic filler (F) | Glass fiber | F-1 | parts by weight | 39.0 | 39.0 | 39.0 | 39.0 | 66.5 |  |  | 39.0 |
|  | Glass fiber | F-2 | parts by weight |  |  |  |  |  | 39.0 |  |  |

TABLE 3-continued

| | Code | Unit | Examples 22 | 23 | 24 | 25 | 26 | 27 | 28 | 29 |
|---|---|---|---|---|---|---|---|---|---|---|
| (B) + (C) | | parts by weight | 54.5 | 54.5 | 54.5 | 54.5 | 54.5 | 54.5 | 53.6 | 54.5 |
| (B)/(C) | | — | 12.3 | 12.3 | 12.3 | 12.3 | 12.3 | 12.3 | 12.4 | 12.3 |
| [(B-1) + (C-1)]/[(A) + (B-1) + (C-1)] × 100 | | % by volume | 43 | 43 | 43 | 43 | 43 | 43 | 43 | 43 |
| Dielectric properties | Relative permittivity | — | 2.96 | 2.96 | 2.97 | 0.96 | 3.21 | 2.72 | 2.55 | 2.95 |
| | Dielectric loss tangent | — | 0.0063 | 0.0062 | 0.0062 | 0.0063 | 0.0067 | 0.0052 | 0.0053 | 0.0058 |
| Mechanical properties | Flexural strength | MPa | 124 | 125 | 122 | 121 | 152 | 136 | 49 | 165 |
| | Flexural modulus | GPa | 3.7 | 3.8 | 3.7 | 3.6 | 6.4 | 4.6 | 1.8 | 4.5 |
| Heat resistance | Heat distortion temperature | °C. | 176 | 179 | 176 | 175 | 190 | 185 | 82 | 186 |
| Metal bondability | Metal bonding strength | — | B | B | B | B | B | B | B | B |
| Dispersion diameter of the component (B) | Dispersion diameter of the components <B-1-1> to <B-1-3> | μm | 2.9 | 2.8 | 2.9 | 3.0 | 1.2 | 1.1 | 1.3 | 1.1 |
| | Dispersion diameter of the components <B-2-1> to <B-2-4> | " | — | — | — | — | — | — | — | — |
| | $\Delta T_{CA'B'}$ | °C. | 69.2 | 69.2 | 69.2 | 69.2 | 69.2 | 69.2 | 69.2 | 69.2 |
| | $\Delta T_{CAB}$ | " | 80.8 | 79.0 | 79.7 | 81.2 | 86.7 | 87.8 | 76.8 | 86.6 |
| | $\Delta T_{CBB'}$ | " | 6.3 | 3.7 | 4.1 | 5.9 | 12.4 | 12.1 | 10.5 | 9.3 |
| Concentration of epoxy groups in a thermoplastic polyester resin composition | | eq/t | 25.8 | 26.2 | 26.7 | 27.5 | 24.5 | 20.0 | 25.3 | 23.3 |

TABLE 4

| | | Code | Unit | Comparative Example 1 | 2 | 3 | 4 | 5 | 6 | 7 |
|---|---|---|---|---|---|---|---|---|---|---|
| Non-liquid crystal thermoplastic polyester resin (A) | Polybutylene terephthalate resin | A-1 | parts by weight | 100 | 100 | 100 | 100 | 100 | 100 | 100 |
| Thermoplastic resin (B) | Linear low-density polyethylene resin | B-1-1 | parts by weight | | 50.4 | 50.4 | 50.4 | 50.4 | 36.0 | 146.0 |
| | Liquid crystal polyester resin | B-2-1 | parts by weight | | | | | | | |
| Compatibilizer (C) | Glycidyl-containing ethylene copolymer | C-1 | parts by weight | 5.0 | | 21.2 | 4.1 | 4.1 | 4.0 | 7.0 |
| Compound (D) | Organic phosphonium salt | D-1 | parts by weight | 0.5 | 0.5 | 0.5 | | 5.5 | 0.5 | 0.5 |
| Inorganic filler (F) | Glass fiber | F-1 | parts by weight | 26.4 | 39.0 | 39.0 | 39.0 | 39.0 | 39.0 | 64.0 |
| (B) + (C) | | | parts by weight | 5.0 | 50.4 | 71.6 | 54.5 | 54.5 | 40.0 | 153.0 |
| (B)/(C) | | | — | 0.0 | — | 2.4 | 12.3 | 12.3 | 9.0 | 20.9 |
| [(B-1) + (C-1)]/[(A) + (B-1) + (C-1)] × 100 | | | % by volume | 7 | 41 | 50 | 43 | 43 | 36 | 68 |
| Dielectric properties | Relative permittivity | | — | 3.20 | 2.98 | 3.00 | 2.96 | 2.96 | 3.06 | 2.80 |
| | Dielectric loss tangent | | — | 0.0082 | 0.0063 | 0.0071 | 0.0062 | 0.0061 | 0.0068 | 0.0048 |
| Mechanical properties | Flexural strength | | MPa | 180 | 107 | 98 | 114 | 107 | 151 | 111 |
| | Flexural modulus | | GPa | 5.6 | 2.4 | 2.1 | 3.1 | 2.7 | 4.7 | 2.5 |
| Heat resistance | Heat distortion temperature | | °C. | 194 | 110 | 107 | 155 | 137 | 190 | 122 |
| Metal bondability | Metal bonding strength | | — | B | C | C | C | C | B | C |
| Dispersion diameter of the component (B) | Dispersion diameter of the components <B-1-1> to <B-1-3> | | μm | — | N | 4.2 | 5.7 | 1.8 | 1.2 | N |
| | Dispersion diameter of the components <B-2-1> to <B-2-4> | | " | — | — | — | — | — | — | — |
| | $\Delta T_{CA'B'}$ | | °C. | — | 69.2 | 69.2 | 69.2 | 69.2 | 69.2 | 69.2 |
| | $\Delta T_{CAB}$ | | " | — | 77.4 | 87.8 | 76.5 | 96.5 | 93.6 | 77.6 |
| | $\Delta T_{CBB'}$ | | " | — | 2.3 | 12.7 | 0.2 | 20.2 | 19.0 | 1.2 |
| Concentration of epoxy groups in a thermoplastic polyester resin composition | | | eq/t | 25.1 | 0.0 | 46.6 | 35.2 | 20.1 | 18.5 | 32.1 |

TABLE 5

|  |  | Code | Unit | Comparative Example | | | | | |
|---|---|---|---|---|---|---|---|---|---|
|  |  |  |  | 8 | 9 | 10 | 11 | 12 | 13 |
| Non-liquid crystal thermoplastic polyester resin (A) | Polybutylene terephthalate resin | A-1 | parts by weight | 100 | 100 | 100 | 100 | 100 | 100 |
| Thermoplastic resin (B) | Linear low-density polyethylene resin | B-1-1 | parts by weight | 20.0 | 70.0 | 47.0 | 50.4 | 38.0 | 38.0 |
|  | Liquid crystal polyester resin | B-2-1 | parts by weight | 20.0 | 70.0 |  |  | 48.0 | 48.0 |
| Compatibilizer (C) | Glycidyl-containing ethylene copolymer | C-1 | parts by weight | 5.0 | 15.0 | 8.2 | 1.0 | 12.0 | 1.5 |
| Compound (D) | Organic phosphonium salt | D-1 | parts by weight | 0.5 | 0.5 | 0.5 | 0.5 | 0.5 | 0.5 |
| Inorganic filler (F) | Glass fiber | F-1 | parts by weight | 37.0 | 64.0 | 39.0 | 39.0 | 48.0 | 48.0 |
| (B) +(C) |  |  | parts by weight | 45.0 | 155.0 | 55.2 | 51.4 | 98.0 | 87.5 |
| (B)/(C) |  |  | — | — | 8.0 | 9.3 | 5.7 | 50.4 | 7.2 | 57.3 |
| [(B-1) + (C-1)]/[(A) + (B-1) + (C-1)] × 100 |  |  | % by volume | 26 | 54 | 43 | 42 | 41 | 35 |
| Dielectric properties | Relative permittivity | — | — | 3.17 | 3.07 | 2.97 | 2.98 | 3.11 | 3.04 |
|  | Dielectric loss tangent | — | — | 0.0070 | 0.0052 | 0.0062 | 0.0063 | 0.0061 | 0.0055 |
| Mechanical properties | Flexural strength | — | MPa | 147 | 111 | 115 | 118 | 147 | 111 |
|  | Flexural modulus | — | GPa | 4.9 | 3.2 | 2.5 | 3.0 | 4.9 | 2.5 |
| Heat resistance | Heat distortion temperature | — | °C. | 195 | 124 | 162 | 165 | 195 | 122 |
| Metal bondability | Metal bonding strength | — | — | B | C | C | C | C | C |
| Dispersion diameter of the component (B) | Dispersion diameter of the components <B-1-1> to <B-1-3> | — | μm | 1.2 | 4.8 | 1.5 | 7.7 | 1.3 | 5.3 |
|  | Dispersion diameter of the components <B-2-1> to <B-2-4> | — | " | 3.6 | 11.4 | — | — | 4.2 | 10.1 |
| $\Delta T_{CA'B'}$ |  |  | °C. | 69.2 | 69.2 | 69.2 | 69.2 | 69.2 | 69.2 |
| $\Delta T_{CAB}$ |  |  | " | 88.2 | 71.9 | 90.3 | 82.0 | 83.1 | 71.5 |
| $\Delta T_{CBB'}$ |  |  | " | 16.4 | 2.1 | 11.7 | 2.7 | 16.0 | 0.8 |
| Concentration of epoxy groups in a thermoplastic polyester resin composition |  |  | eq/t | 24.0 | 34.7 | 41.8 | 7.3 | 37.2 | 15.5 |

As demonstrated by the comparison among Examples 1 to 29 and Comparative Examples 1 to 13, materials with an excellent balance among low dielectric properties, mechanical properties, heat resistance, and metal bondability were obtained by limiting the blending amounts of the component (B), the component (C), and the component (D) to those within the specified ranges, with respect to 100 parts by weight of the non-liquid crystal thermoplastic polyester resin (A).

As demonstrated by the comparison among Examples 1 to 4, materials with higher metal bondability were obtained in the cases where the polybutylene terephthalate and the polyethylene terephthalate were used, and where the polybutylene (terephthalate/isophthalate) resin was used, as the non-liquid crystal thermoplastic polyester resin (A).

As demonstrated by the comparison among Examples 1, 10, and 11, materials with more excellent mechanical properties were obtained in the cases where the polyolefin resin (B-1) is at least one unmodified polyethylene selected from the high-density polyethylene and the linear low-density polyethylene.

As demonstrated by the comparison among Examples 1 and 9 to 13, materials with more excellent mechanical properties and higher heat resistance were obtained in the cases where the polyolefin resin (B-1) and another thermoplastic resin with excellently low dielectric properties (B-2) were used as the thermoplastic resin with excellently low dielectric properties (B).

As demonstrated by the comparison among Examples 1 and 18 to 21, a material with more excellent mechanical properties and higher heat resistance was obtained in the case where the glycidyl-containing ethylene copolymer was used as the compatibilizer (C).

As demonstrated by the comparison among Examples 1 and 22 to 26, materials with more excellent mechanical properties and higher heat resistance were obtained in the cases where the organic phosphonium salt was used as the compound (D).

As demonstrated by the comparison among Examples 1, 5 to 9 and Comparative Examples 1 to 3 and 6 to 13, the addition of specified amounts of the thermoplastic resin with excellently low dielectric properties (B) and the compatibilizer (C) resulted in production of materials with an excellent balance among mechanical properties, heat resistance, low dielectric properties, and metal bondability.

As demonstrated by the comparison among Example 1 and Comparative Examples 3 and 4, the addition of a specified amount of the component (D) resulted in finely dispersed distribution of the thermoplastic resin with excellently low dielectric properties (B) and in production of materials with excellent mechanical properties, high heat resistance, and high metal bondability.

As demonstrated by the comparison among Examples 1, 26, and 28, the further addition of the inorganic filler (F) resulted in production of materials with excellent mechanical properties and high heat resistance.

As demonstrated by the comparison between Examples 1 and 27, the addition of the low dielectric glass fibers as the inorganic filler (F) resulted in production of a material with excellently lower dielectric properties.

As demonstrated by the comparison between Examples 1 and 29, the addition of the metal salt of the organic phosphate ester (E) resulted in production of a material with excellently low dielectric properties, excellent mechanical properties, and high heat resistance.

The invention claimed is:

1. A thermoplastic polyester resin composition comprising:
100 parts by weight of (A) a non-liquid crystal thermoplastic polyester resin,
45 to 150 parts by weight of (B) a thermoplastic resin that is different from the non-liquid crystal thermoplastic polyester resin (A), that comprises at least one polyolefin resin (B-1) selected from polyethylene, polypropylene, polymethyl pentene and cyclic olefin polymers, and that has a dielectric loss tangent of not more than 0.005 when measured at a frequency of 5.8 GHz by the cavity resonance perturbation method,
2 to 20 parts by weight of (C) a compatibilizer having at least one reactive functional group selected from epoxy, acid anhydride, oxazoline, isocyanate, and carbodiimide groups, and
0.2 to 5 parts by weight of (D) at least one compound selected from tertiary amines, amidine compounds, organic phosphines and salts thereof, imidazoles, and boron compounds,
wherein the sum of the parts by weight of the thermoplastic resin (B) and the compatibilizer (C) is in the range of 50 to 150 parts by weight based on 100 parts by weight of (A), and the weight ratio (B)/(C) of the thermoplastic resin (B) to the compatibilizer (C) is in the range of 8 to 50, and
wherein the cold crystallization temperature measured by differential scanning calorimetry satisfies the following requirements (2) to (4):

$$3 \leq T_{CB'} - T_{CB} < 20 \quad (2);$$

$$|T_{CA} - T_{CB}| \geq 20 \quad (3);$$

$$|T_{CA'} - T_{CB'}| \geq 20 \quad (4),$$

wherein $T_{CA}$ (° C.) is the cold crystallization temperature ($T_{CA}$) derived from the non-liquid crystal thermoplastic polyester resin (A) in the thermoplastic polyester resin composition, and $T_{CB}$ (° C.) is the cold crystallization temperature ($T_{CB}$) derived from the polyolefin resin (B-1) in the thermoplastic polyester resin composition, and $T_{CA'}$ (° C.) is the cold crystallization temperature ($T_{CA'}$) observed when the measurement is performed on the component (A) alone, and $T_{CB'}$ (° C.) is the cold crystallization temperature ($T_{CB'}$) observed when the measurement is performed on the component (B-1) alone.

2. The thermoplastic polyester resin composition according to claim 1, wherein
the thermoplastic resin (B) has a dielectric loss tangent of not more than 0.005 when measured at a frequency of 5.8 GHz by the cavity resonance perturbation method,
(D) is a compound represented by formula (1)

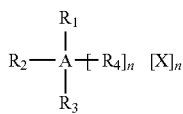

(1)

wherein $R_1$ to $R_4$ are selected from hydrogen, $C_{1-12}$ alkyl groups, phenyl group, and benzyl group, and may be the same or different; A represents a phosphorus atom; X represents a halogen atom; and n is 0 or 1.

3. The thermoplastic polyester resin composition according to claim 1, wherein the compatibilizer having at least one reactive functional group selected from epoxy, acid anhydride, oxazoline, isocyanate, and carbodiimide groups (C) is (C-1) a glycidyl-containing ethylene copolymer.

4. The thermoplastic polyester resin composition according to claim 1, wherein the thermoplastic resin (B) is at least one thermoplastic resin selected from polyolefin, liquid crystal polyester, polyphenylene sulfide, polystyrene, and polyphenylene ether resins.

5. The thermoplastic polyester resin composition according to claim 1,
wherein the thermoplastic resin (B) is (B-1) a polyolefin resin, and the compatibilizer having at least one reactive functional group selected from epoxy, acid anhydride, oxazoline, isocyanate, and carbodiimide groups (C) is (C-1) a glycidyl-containing ethylene copolymer, and
wherein the sum of the polyolefin resin (B-1) and the glycidyl-containing ethylene copolymer (C-1) is in the range of 20 to 65% by based on 100% by volume including the sum of the non-liquid crystal thermoplastic polyester resin (A), the polyolefin resin (B-1), and the glycidyl-containing ethylene copolymer (C-1).

6. The thermoplastic polyester resin composition according to claim 1, wherein the thermoplastic resin (B) comprises at least (B-1) a polyolefin resin, and wherein the polyolefin resin is at least one unmodified polyethylene selected from high-density polyethylenes, low-density polyethylenes, and linear low-density polyethylenes.

7. The thermoplastic polyester resin composition according to claim 1, wherein the thermoplastic resin (B) is composed of 10 to 140 parts by weight of the polyolefin resin (B-1) and 10 to 140 parts by weight of (B-2) at least one thermoplastic resin selected from liquid crystal polyester, polyphenylene sulfide, polystyrene, and polyphenylene ether resins, with respect to 100 parts by weight of the non-liquid crystal thermoplastic polyester resin (A).

8. The thermoplastic polyester resin composition according to claim 1, further comprising 1 to 100 parts by weight of (F) an inorganic filler, with respect to 100 parts by weight of the non-liquid crystal thermoplastic polyester resin (A).

9. The thermoplastic polyester resin composition for insert molding according to claim 1, wherein the thermoplastic polyester resin composition is used in a composite form with a metal component.

10. A molded article obtained by molding the thermoplastic polyester resin composition according to claim 1 through a melt molding process.

11. A metal composite molded article composed of a plastic component and a metal component, wherein the plastic component is made from the thermoplastic polyester resin composition according to claim 1.

12. The metal composite molded article according to claim 11, wherein the metal composite molded article is a component for telecommunication devices.

* * * * *